US012631904B2

(12) United States Patent
Webber et al.

(10) Patent No.: US 12,631,904 B2
(45) Date of Patent: May 19, 2026

(54) CONTACT LENSES AND METHODS RELATING THERETO

(71) Applicant: CooperVision International Limited, Fareham (GB)

(72) Inventors: Martin Webber, Southampton (GB); Arthur Bradley, Bloomington, IN (US); Baskar Arumugam, Dublin, CA (US); David S. Hammond, Pleasanton, CA (US); Paul Chamberlain, Livermore, CA (US)

(73) Assignee: COOPERVISION INTERNATIONAL LIMITED, Fareham (GB)

( * ) Notice: Subject to any disclaimer, the term of this patent is extended or adjusted under 35 U.S.C. 154(b) by 237 days.

(21) Appl. No.: 18/716,173

(22) PCT Filed: Dec. 15, 2022

(86) PCT No.: PCT/GB2022/053241
§ 371 (c)(1),
(2) Date: Jun. 4, 2024

(87) PCT Pub. No.: WO2023/118813
PCT Pub. Date: Jun. 29, 2023

(65) Prior Publication Data
US 2025/0035959 A1 Jan. 30, 2025

Related U.S. Application Data

(60) Provisional application No. 63/291,993, filed on Dec. 21, 2021.

(51) Int. Cl.
*G02C 7/04* (2006.01)
*G02C 7/06* (2006.01)

(52) U.S. Cl.
CPC ............. *G02C 7/044* (2013.01); *G02C 7/049* (2013.01); *G02C 7/066* (2013.01); *G02C 2202/24* (2013.01)

(58) Field of Classification Search
None
See application file for complete search history.

(56) References Cited

U.S. PATENT DOCUMENTS 5,422,687 A * 6/1995 Tanaka ................... G02C 7/042
351/159.48
6,116,735 A 9/2000 Wada
(Continued)

FOREIGN PATENT DOCUMENTS

AU 2010246164 B2 11/2010
AU 2010308489 C1 4/2011
(Continued)

OTHER PUBLICATIONS

Office Action issued in corresponding Spanish Patent Application 202490034 dated Dec. 11, 2024 (16 pages).
(Continued)

*Primary Examiner* — Darryl J Collins
(74) *Attorney, Agent, or Firm* — Kilyk & Bowersox, P.L.L.C.

(57) ABSTRACT

A contact lens (201) and methods of manufacturing such a lens are described. The lens (201) includes an optic zone (202). The optic zone (202) comprises a central region (205), the central region (205) having a first optical axis (219), a base radial curvature power, a base radial sagittal power, and a centre of curvature that is on the first optical axis (219). The optic zone (202) comprises an annular region (203), wherein at a point halfway across the width of the annular region (203) the annular region (203) has a radial curvature power of X, wherein X is greater than the base radial curvature power. The annular region (203) has an off-axis (Continued)

centre of curvature that is a first distance from the optical axis (219) such that, at a point halfway across its width, the annular region (203) has a sagittal power of Y, wherein Y is greater than the base radial sagittal power, and wherein Y is less than X.

20 Claims, 18 Drawing Sheets

(56) References Cited

U.S. PATENT DOCUMENTS

| | | | |
|---|---|---|---|
| 6,260,966 B1 | 7/2001 | Sawano et al. | |
| 9,594,258 B2 * | 3/2017 | Fujikado | G02C 7/047 |
| 2003/0123024 A1 | 7/2003 | Dunn | |
| 2007/0296916 A1 | 12/2007 | Holden et al. | |
| 2009/0257026 A1 | 10/2009 | Varnas et al. | |
| 2009/0323020 A1 | 12/2009 | Zhao et al. | |
| 2010/0073629 A1 | 3/2010 | Menezes | |
| 2010/0073635 A1 | 3/2010 | Legerton et al. | |
| 2010/0296050 A1 | 11/2010 | Goto et al. | |
| 2011/0153012 A1 | 6/2011 | Legerton et al. | |
| 2012/0320333 A1 | 12/2012 | Holden et al. | |
| 2013/0182215 A1 | 7/2013 | Tung | |
| 2016/0054586 A1 | 2/2016 | Brennan et al. | |
| 2016/0357030 A1 | 12/2016 | Gerligand et al. | |
| 2016/0377884 A1 | 12/2016 | Lau et al. | |
| 2018/0024380 A1 | 1/2018 | Vu et al. | |
| 2019/0227342 A1 | 7/2019 | Brennan et al. | |
| 2019/0302478 A1 | 10/2019 | Lin et al. | |
| 2020/0041816 A1 | 2/2020 | Gifford et al. | |
| 2021/0055573 A1 | 2/2021 | Back et al. | |
| 2021/0191155 A1 | 6/2021 | Brennan et al. | |
| 2021/0191156 A1 | 6/2021 | Brennan et al. | |
| 2022/0197060 A1 | 6/2022 | Chamberlain et al. | |
| 2022/0350165 A1 * | 11/2022 | Webber | G02C 7/044 |
| 2023/0032140 A1 | 2/2023 | Chamberlain et al. | |
| 2023/0194896 A1 | 6/2023 | Webber et al. | |

FOREIGN PATENT DOCUMENTS

| | | | |
|---|---|---|---|
| CN | 1198221 A | 11/1998 | |
| CN | 101317120 A | 12/2008 | |
| CN | 101467092 A | 6/2009 | |
| CN | 102906631 A | 1/2013 | |
| CN | 104136964 A | 11/2014 | |
| CN | 107643608 A | 1/2018 | |
| CN | 110235051 A | 9/2019 | |
| EP | 0938016 B1 | 7/2004 | |
| EP | 3290994 A1 | 3/2018 | |
| GB | 2607709 A | 12/2022 | |
| HU | E054395 T2 | 9/2021 | |
| HU | E063868 T2 | 2/2024 | |
| JP | 2013511072 A | 3/2013 | |
| JP | 2018045232 A | 3/2018 | |
| KR | 10-2017-0000355 A | 1/2017 | |
| TW | M533235 U | 12/2016 | |
| TW | 201712403 A | 4/2017 | |
| WO | 2021159169 A1 | 8/2021 | |
| WO | 2022038581 A1 | 2/2022 | |

OTHER PUBLICATIONS

Search Report issued in corresponding Hungarian Patent Application P2400360 dated Dec. 12, 2024 (4 pages).

Office Action issued in corresponding Taiwan Patent Application 113126117 issued Jan. 23, 2025 (8 pages).

Office Action issued in corresponding Chinese Patent Application 202280080627.5 dated Feb. 16, 2025 (12 pages).

Search Report issued in corresponding United Kingdom Patent Application No. GB2218938.5 dated Jun. 15, 2023 (5 pages).

Office Action issued in corresponding Japanese Patent Application 2024-529974 issued Apr. 28, 2025 (12 pages).

Notice of Allowance issued in corresponding Chinese Patent Application 202280080627.5 issued Jan. 2, 2026 (8 pages).

PCT Demand filed Aug. 15, 2023 in corresponding International Patent Application No. PCT/GB2022/053241 (18 pages).

Second Written Opinion issued in corresponding International Patent Application No. PCT/GB2022/053241 dated Sep. 21, 2023 (8 pages).

Office Action issued in corresponding Taiwan Patent Application No. 111149105 issued Jul. 7, 2023 (with English translation)(11 pages).

International Search Report and Written Opinion issued in corresponding International Patent Application No. PCT/GB2022/053241 dated Mar. 9, 2023 (15 pages).

International Preliminary Report on Patentability issued in corresponding International Patent Application No. PCT/GB2022/053241 dated Mar. 25, 2024 (19 pages).

Office Action issued in corresponding United Kingdom Patent Application GB2403785.5 dated Apr. 24, 2024 (5 pages).

Response to Second Written Opinion filed Nov. 21, 2023 in corresponding International Patent Application No. PCT/GB2022/053241 (5 pages).

Examination Report issued in corresponding United Kingdom Patent Application GB2403785.5 dated May 30, 2024 (11 pages).

Search Report relating to claims 2, 4-15 in part issued in corresponding United Kingdom Patent Application GB2403785.5 dated May 30, 2024 (10 pages).

Search Report relating to claims 3, 4-15 in part issued in corresponding United Kingdom Patent Application GB2403785.5 dated May 30, 2024 (10 pages).

* cited by examiner

31

35

33

37

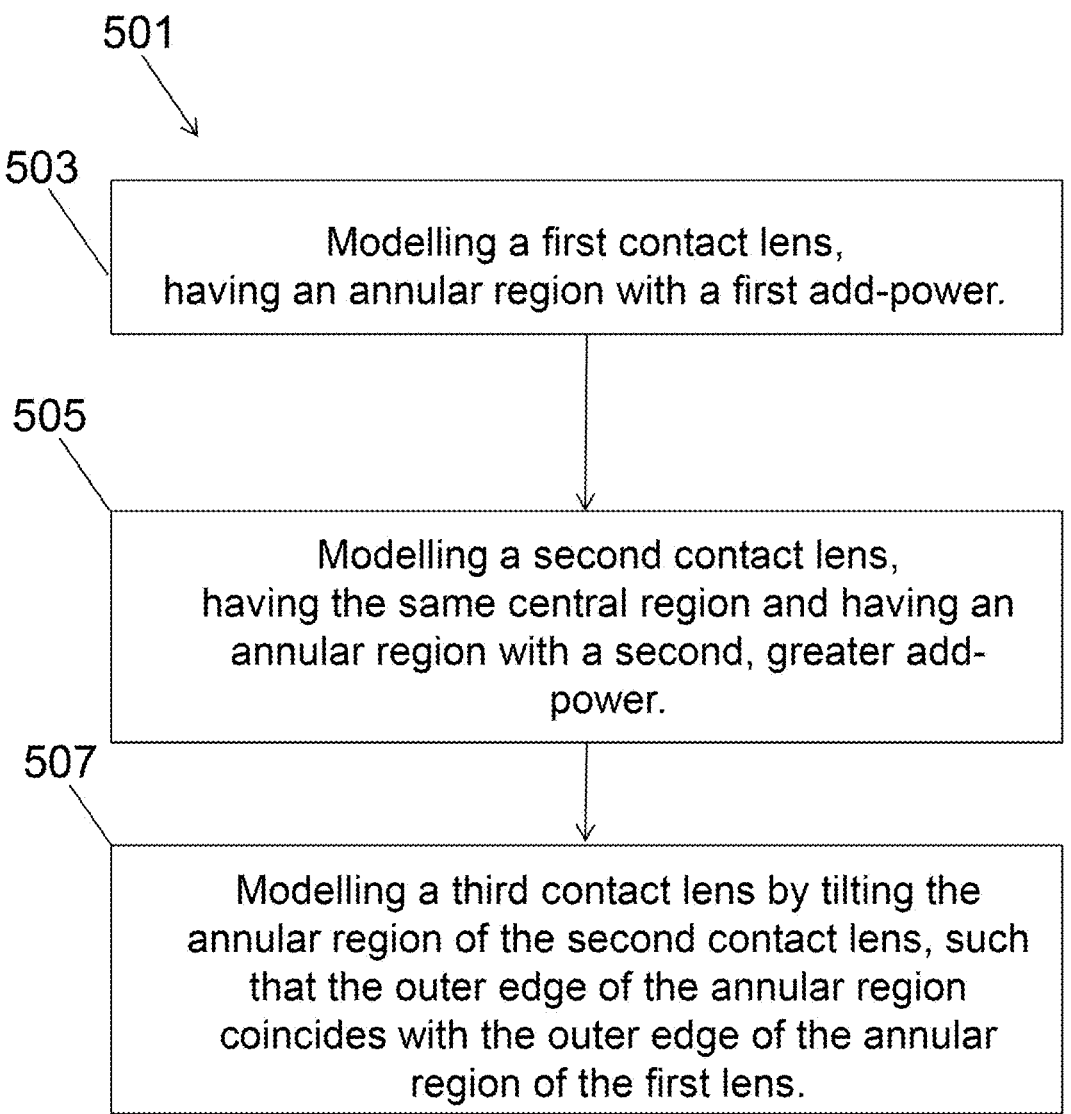

501

503

Modelling a first contact lens,
having an annular region with a first add-power.

505

Modelling a second contact lens,
having the same central region and having an
annular region with a second, greater add-
power.

507

Modelling a third contact lens by tilting the
annular region of the second contact lens, such
that the outer edge of the annular region
coincides with the outer edge of the annular
region of the first lens.

FIG. 16

CONTACT LENSES AND METHODS RELATING THERETO

This application is a National Stage Application of PCT/GB2022/053241, filed Dec. 15, 2022, which claims priority to U.S. Provisional Patent Application No. 63/291,993, filed Dec. 21, 2021.

TECHNICAL FIELD

The present invention relates to contact lenses. The present invention relates especially, but not exclusively, to contact lenses for slowing the progression of myopia. The present invention also relates especially, but not exclusively, to contact lenses for use by presbyopes. The present invention also relates to methods of manufacturing such lenses.

BACKGROUND

Many people, including children and adults require contact lenses to correct for myopia (short-sightedness) and many adults may require lenses to correct for presbyopia (an age-related inability to accommodate and hence inability to focus on near objects).

Myopic eyes focus incoming light from distant objects to a location in front of the retina. Consequently, the light converges towards a plane in front of the retina and diverges towards, and is out of focus upon arrival at, the retina. Conventional lenses (e.g., spectacle lenses and contact lenses) for correcting myopia reduce the convergence (for contact lenses), or cause divergence (for spectacle lenses) of incoming light from distant objects before it reaches the eye, so that the location of the focus is shifted onto the retina.

Presbyopic eyes do not change shape effectively to accommodate for near objects, and therefore people with presbyopia cannot focus on near objects. Conventional lenses (e.g., spectacle lenses and contact lenses) for correcting presbyopia include bifocal or progressive lenses, which include regions that are optimised for near vision and regions that are optimised for distance vision. Presbyopia may also be treated using bifocal or multifocal lenses, or monovision lenses (wherein different prescription are provided for each eye, one eye being provided with a distance vision lens, and one eye being provided with a near vision lens).

It was suggested several decades ago that progression of myopia in children or young people could be slowed or prevented by under-correcting, i.e., moving the focus towards but not quite onto the retina. However, that approach necessarily results in degraded distance vision compared with the vision obtained with a lens that fully corrects for myopia. Moreover, it is now regarded as doubtful that under-correction is effective in controlling developing myopia. A more recent approach to correct for myopia is to provide lenses having both one or more regions that provide full correction of distance vision and one or more regions that under-correct, or deliberately induce, myopic defocus. It has been suggested that this approach can prevent or slow down the development or progression of myopia in children or young people, whilst providing good distance vision.

In the case of lenses having regions that provide defocus, the regions that provide full-correction of distance vision are usually referred to as base power regions and the regions that provide under-correction or deliberately induce myopic defocus are usually referred to as myopic defocus regions or add power regions (because the dioptric power is more positive, or less negative, than the power of the distance regions). A surface (typically the anterior surface) of the add power region(s) has a smaller radius of curvature than that of the distance power region(s) and therefore provides a more positive or less negative power to the eye. The add power region(s) are designed to focus incoming parallel light (i.e., light from a distance) within the eye in front of the retina (i.e., closer to the lens), whilst the distance power region(s) are designed to focus light and form an image at the retina (i.e., further away from the lens).

A known type of contact lens that reduces the progression of myopia is a dual-focus contact lens, available under the name of MISIGHT (CooperVision, Inc.). This dual-focus lens is different than bifocal or multifocal contact lenses configured to improve the vision of presbyopes, in that the dual-focus lens is configured with certain optical dimensions to enable a person who is able to accommodate to use the distance correction (i.e., the base power) for viewing both distant objects and near objects. The treatment zones of the dual-focus lens that have the add power also provide a myopically defocused image at both distant and near viewing distances.

Whilst these lenses have been found to be beneficial in preventing or slowing down the development or progression of myopia, annular add power regions can give rise to unwanted visual side effects. Light that is focused by the annular add power regions in front of the retina diverges from the focus to form a defocused annulus at the retina. Wearers of these lenses therefore may see a ring or 'halo' surrounding images that are formed on the retina, particularly for small bright objects such as street lights and car headlights. Also, rather than using the natural accommodation of the eye (i.e., the eye's natural ability to change focal length) to bring nearby objects into focus, in theory, wearers can make use of the additional focus in front of the retina that results from the annular add power region to focus near objects; in other words, wearers can inadvertently use the lenses in the same manner as presbyopia correction lenses are used, which is undesirable for young subjects.

Further lenses have been developed which can be used in the treatment of myopia, and which are designed to eliminate the halo that is observed around focused distance images in the MISIGHT (CooperVision, Inc.) lenses and other similar lenses described above. In these lenses, the annular region is configured such that no single, on-axis image is formed in front of the retina, thereby preventing such an image from being used to avoid the need for the eye to accommodate near targets. Rather, distant point light sources are imaged by the annular region to a ring-shaped focal line at a near add power focal surface, leading to a small spot size of light, without a surrounding 'halo' effect, on the retina at a distance focal surface.

For treating myopia, it is recognised that it may be beneficial to provide a lens that introduces additional myopic defocus. For treating presbyopia, it may be beneficial to provide a lens that gives rise to an extended depth of focus.

SUMMARY

According to a first aspect, the present disclosure provides a contact lens including an optic zone. The optic zone comprises a central region, the central region having a first optical axis, a base radial curvature power and a base radial sagittal power. The central region has a centre of curvature that is on the first optical axis. The optic zone comprises an annular region, wherein, at a point halfway across the annular region, the annular region has a radial curvature power of X, wherein X is greater than the base radial curvature power. The annular region has an off-axis centre of curvature that is a first distance from the optical axis. At a point halfway across its width, the annular region has a radial sagittal power of Y, wherein Y is greater than the base radial sagittal power, and wherein Y is less than X.

According to a second aspect, the present disclosure provides a method of manufacturing a lens. The method comprises forming the contact lens of the first aspect of the invention.

It will of course be appreciated that features described in relation to one aspect of the present disclosure may be incorporated into other aspects of the present disclosure. For example, the method of the disclosure may incorporate features described with reference to the apparatus of the disclosure and vice versa.

DESCRIPTION OF THE FIGURES

Embodiments of the present invention will now be described by way of example only with reference to the accompanying schematic drawings of which:

FIG. 16 is a flowchart showing a method of designing a contact lens according to an embodiment of the present disclosure.

DETAILED DESCRIPTION

Figure 1A:
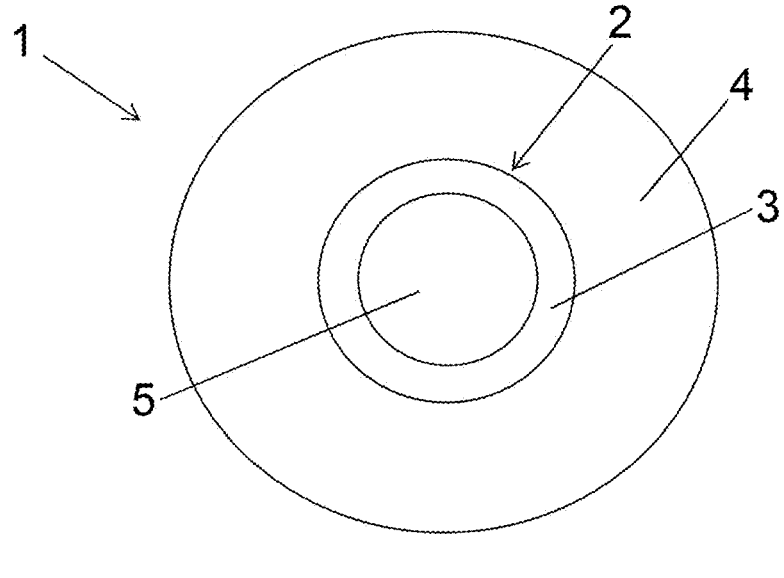
FIG. 1A is a schematic top view of a contact lens that uses a treatment zone that provides a myopically defocused image to reduce the progression of myopia.

According to a first aspect, the present disclosure provides a contact lens. The lens includes an optic zone comprising a central zone, the central zone having a first optical axis, a base radial curvature power and a base radial sagittal power, and a centre of curvature that is on the first optical axis. The central region has an annular region. At a point hallway across the width of the annular region, the annular region has a radial curvature power of X. X is greater than the base radial curvature power. The annular region has an off-axis centre of curvature that is a first distance from the optical axis, and such that, at a point halfway across its width, the annular region has a radial sagittal power of Y, wherein Y is greater than the base radial sagittal power, and wherein Y is less than X.

As used herein, the term contact lens refers to an ophthalmic lens that can be placed onto the anterior surface of the eye. It will be appreciated that such a contact lens will provide clinically acceptable on-eye movement and not bind to the eye or eyes of a person. The contact lens may be in the form of a corneal lens (e.g., a lens that rests on the cornea of the eye). The contact lens may be a soft contact lens, such as a hydrogel contact lens or a silicone hydrogel contact lens. The lens may be a lens for use in preventing or slowing the development or progression of myopia the lens may be for use in providing an extended depth of focus to a myopic eye.

A contact lens according to the present disclosure comprises an optic zone. The optic zone encompasses the parts of the lens that have optical functionality. The optic zone is configured to be positioned over the pupil of an eye when in use. For contact lenses according to the present disclosure, the optic zone comprises the central region, and the annular region (or regions) that surrounds the central region. The optic zone is surrounded by a peripheral zone. The peripheral zone is not part of the optic zone, but sits outside the optic zone and above the iris when the lens is worn, and it provides mechanical functions, for example, increasing the size of the lens thereby making the lens easier to handle, providing ballasting to prevent rotation of the lens, and/or providing a shaped region that improves comfort for the lens wearer. The peripheral zone may extend to the edge of the contact lens.

A contact lens according to an embodiment of the disclosure may include a ballast to orient the lens when positioned on the eye of a wearer. Embodiments of the disclosure incorporating a ballast into the contact lens will, when placed on the eye of a wearer, rotate under the action of the wearer's eyelid to a pre-determined angle of repose; for example, the ballast may be a wedge and the rotation may result from the action of the eyelid on the wedge. It is well-known in the art to ballast a contact lens to orient a contact lens; for example, toric contact lenses are ballasted to orient the lens so that the orthogonal cylindrical corrections provided by the lens align correctly for the astigmatism of the wearer's eye. It may be that the contact lens of the present disclosure provides particular benefit to the wearer in a given orientation. For example, the contact lens may provide particular benefit to the wearer when a maximum add power meridian is in a particular orientation.

The contact lens may be substantially circular in shape and have a diameter from about 4 mm to about 20 mm. The optic zone may be substantially circular in shape and may have a diameter from about 2 mm to about 10 mm. In some embodiments, the contact lens has a diameter from 13 mm to 15 mm, and the optic zone has a diameter from 7 mm to 9 mm.

The first optic axis may lie along the centreline of the lens. The central region may focus light from a distant point object, on the first optical axis, to a spot on the first optical axis at a distal focal surface. The term surface, as used herein, does not refer to a physical surface, but to a surface that could be drawn through points where light from distant objects would be focused. Such a surface is also referred to as an image plane (even though it can be a curved surface) or image shell. The eye focuses light onto the retina which is curved, and in a perfectly focused eye, the curvature of the image shell would match the curvature of the retina, therefore the eye does not focus light onto a flat mathematical plane. However, in the art, the curved surface of the retina is commonly referred to as a plane.

The central region may be substantially circular in shape and may have diameter of between about 2 and 9 mm, and preferably may be between 2 and 7 mm. The central region may be substantially elliptical in shape. The annular region may extend radially outwards from a perimeter of the central region by between about 0.1 to 4 mm, preferably between about 0.5 and 1.5 mm. For example, the radial width of the annular region may be about 0.1 mm to about 4 mm, and preferably may be about 0.5 mm to about 1.5 mm. The perimeter of the central region may define a boundary between the central region and the annular region, and the annular region may therefore be adjacent to the central region.

The annular region may abut the central region. A blending region may be provided between the central region and the annular region. The blending region should not substantially affect the optics provided by the central region and the annular region, and the blending region may have a radial width of 0.05 mm or less, although it may also be as wide as 0.2 mm, or as wide as 0.5 mm in some embodiments.

In the context of the present disclosure, the power of the central and annular regions of the lens can be defined as radial curvature power, a circumferential curvature power, an average curvature power (which is the average of the radial and circumferential curvature powers), a radial sagittal power, a circumferential sagittal power, and an average sagittal power, (which is the average of the radial and circumferential sagittal powers).

The curvature and sagittal powers are defined as follows:

For a wavefront W, at a point a radial distance r (pupil radius) from a line normal to the centre of the wavefront, $W(r)=A*r^2$, where A is a function.

The wavefront curvature or curvature power, $P_C$, is a function of the second derivative of the wavefront. The wavefront slope, or slope based power $P_S$, is a function of the first derivative of the wavefront and varies with the slope of the wavefront.

For a simple spherical lens, the curvature power, $P_C$, is defined as:

$$P_C = \frac{\partial^2 W}{\partial r^2} = \frac{\partial (2Ar)}{\partial r} = 2A$$

The slope based power $P_S$ is defined as $$P_S = \frac{1}{r}\frac{\partial W}{\partial r} = \frac{2Ar}{r} = 2A$$

i.e., $P_C=P_S$ for a simple lens (with paraxial assumptions).

The radial curvature power is the curvature power in a direction extending radially outward from centre of curvature of the lens. The circumferential curvature power is the curvature power at a constant radial coordinate, extending around the circumference of the lens. The average curvature provides an average of the radial and circumferential curvature powers.

The radial sagittal power is the sagittal power in a direction extending radially outward from the centre of the lens. The circumferential sagittal power the sagittal power at a constant radial coordinate, extending around the circumference of the lens.

The central region may have a curvature power that is the same as the sagittal power. This is referred to herein as the base curvature power, the base sagittal power, or the base power. The nominal power of the central region will correspond to the labelled refractive power of the contact lens as provided on the contact lens packaging (though in practice it may not have the same value). This will be the average sagittal or average curvature power taken across the central region. The measured power of the central region is the directly measured average refractive curvature or sagittal power taken across the central region. This may differ from the nominal power.

For lenses used in the treatment of myopia, the base power will be negative or close to zero, and the central region will correct for distance vision. The base power may be between 0.5 diopters (D) and −15.0 diopters. The base power may be from −0.25 D to −15.0 D.

The base power of the central region may result from a curvature of a surface of the lens. The base power may result from a curvature of an anterior surface of the lens and/or a centre of curvature of a posterior surface of the lens.

In the context of the present disclosure, the annular region is a substantially annular region that surrounds the optic zone. It may have a substantially circular shape or a substantially elliptical shape. It may fully surround the optic zone. It may partially surround the optical zone.

For embodiments of the present disclosure, the radial curvature power of the annular region is greater than the base radial curvature power of the central region.

The radial curvature power of the annular region may be determined by the curvature of at least one surface of the annular region. The radial curvature power of the annular region may result from the curvature of an anterior surface and/or a posterior surface of the lens. The annular region may have a greater curvature, or a smaller radius of curvature, than the central region. The anterior surface of the annular region may have a greater curvature, or smaller radius of curvature than the curvature of the central region. Alternatively, or additionally, the posterior surface of the annular region may have a greater curvature than the curvature of the central region.

The radial curvature power may vary across the annular region. At a point half way across the width of the annular region, the radial curvature power of the annular region is X. The radial curvature power will be a more positive power (or less negative) than the base radial curvature power. The net radial curvature power of the annular region will be the sum of the base radial curvature power of the central region, and the radial curvature add power of the annular region. For example, if the base radial curvature power is −3.0 D, and the radial curvature add power of the annular region is +4.0 D, the net radial curvature power of the annular region will be +1.0 D.

The value of X may be between +0.5 and +20.0 D. The value of X may be +10.0 D greater than the base radial curvature power (i.e., the radial curvature add power at a point half way across the width of the annular region may be +10.0 D). The value of X may be +11.0 D greater than the base radial curvature power (i.e., the radial curvature add power at a point half way across the width of the annular region may be +11.0 D). The value of X may be +12.0 D greater than the base radial curvature power (i.e., the radial curvature add power at a point half way across the width of the annular region may be +12.0 D).

The annular region can be understood to be tilted relative to the central region. As used herein, the tilting of the annular region means circularly symmetric tilting rather than lateral tilting. The annular region is tilted about a curve that extends around the circumference of the lens, such that the outer edge of the annular region moves in a first direction, and the inner edge of the annular region moves in an opposite direction. Tilting the annular region will alter the radial sagittal power of the annular region, as this is a function of the first derivative of the wavefront, but will not alter the radial curvature power of the annular region, which is a function of the second derivative of the wavefront.

Tilting the annular region relative to the central region will mean that the centre of curvature of the annular region is shifted by a first distance, away from the first optical axis of the central region. The radial sagittal power of the annular region may vary across the width of the annular region, and in embodiments of the present disclosure. At a point halfway across the width of the annular region, the radial sagittal power of the annular region is Y. Y will be greater than the base radial sagittal power of the central region but Y will be less than X (the radial curvature power of the annular region at a point halfway across the width of the annular region). The radial sagittal power of the annular region will be more positive than the sagittal power of the central region. The net radial sagittal power of the annular region will be the sum of the base radial sagittal power and the radial sagittal add power of the annular region. The value of Y may be between +0.5 and +10.0 D. The value of Y may be +2.0 D greater than the base radial sagittal power (i.e., the radial sagittal add power at a point half way across the width of the annular region may be +2.0 D). The value of Y may be +4.0 D greater than the base radial sagittal power (i.e., the radial sagittal add power at a point half way across the width of the annular region may be +4.0 D). The value of Y may be +3.0 D greater than the base radial sagittal power (i.e., the radial sagittal add power at a point half way across the width of the annular region may be +3.0 D).

Example combinations of values for X and Y are described below. The skilled person would immediately understand that many other combinations of X and Y values fall within the scope of the present disclosure.

The value of X may be +10.0 D greater than the base radial curvature power (i.e., the radial curvature add power at a point half way across the width of the annular region may be +10.0 D), and the value of Y may be +2.0 D greater than the base radial sagittal power (i.e., the radial sagittal add power at a point half way across the width of the annular region may be +2.0 D).

The value of X may be +12.0 D greater than the base radial curvature power (i.e., the radial curvature add power at a point half way across the width of the annular region may be +12.0 D), and the value of Y may be +4.0 D greater than the base radial sagittal power (i.e., the radial sagittal add power at a point half way across the width of the annular region may be +4.0 D).

The value of X may be +10.0 D greater than the base radial curvature power (i.e., the radial curvature add power at a point half way across the width of the annular region may be +10.0 D), and the value of Y may be +3.0 D greater than the base radial sagittal power (i.e., the radial sagittal add power at a point half way across the width of the annular region may be +3.0 D).

The value of X may be +11.0 D greater than the base radial curvature power (i.e., the radial curvature add power at a point half way across the width of the annular region may be +11.0 D), and the value of Y may be +3.0 D greater than the base radial sagittal power (i.e., the radial sagittal add power at a point half way across the width of the annular region may be +3.0 D).

The value of X may be +12.0 D greater than the base radial curvature power (i.e., the radial curvature add power at a point half way across the width of the annular region may be +12.0 D), and the value of Y may be +3.0 D greater than the base radial sagittal power (i.e., the radial sagittal add power at a point half way across the width of the annular region may be +3.0 D).

The radial curvature power of the annular region may be greater than the circumferential curvature power of the annular region. The circumferential curvature power of the annular region may be the same as the base circumferential curvature power. The circumferential sagittal power of the annular region may be the same as the circumferential base sagittal power.

The radial sagittal power of the annular region may be greater than the radial sagittal power of the central region over the width of the annular region. In known centre-distance lens designs that have an annular region providing an add-power, wherein the centre of curvature of the annular region is coincident with the optical axis of the central region (this may be referred to as an on-axis annular region), the radial sagittal power of the annular region will be greater than the radial sagittal power of the central region across the width of the annular region. For known centre-distance lens designs that have an annular region that provides an add-power, wherein the centre of curvature of the annular region is shifted away from the optical axis of the central region (this may be referred to as an off-axis annular region), the radial sagittal power of the annular region may be lower than the radial sagittal power of the central region at the inner-most edge of the annular region, as a result of a tilt of the annular region relative to the central region. The radial sagittal power may increase with increasing radial distance towards the outer edge of the annular region. In these known designs, the annular region may be tilted radially relative to the central region such that the radial sagittal power at the midpoint across the width of the annular region matches the radial sagittal power that the central region would have if it were extended to that midpoint. The lens may have a radial sagittal power at the midpoint of the annular region that matches the radial sagittal power that the central region would have if it were extended out to the midpoint.

The combined effect of an annular region that is tilted relative to the central region, and a small radius of curvature of the annular region mean that the radial sagittal power of the annular region may be greater than the radial sagittal power of the central region across the entire annular region width. Alternatively, there may be a dip in the sagittal power of the annular region towards the boundary between the central region and the annular region.

The radial sagittal power may increase radially outwards across the width of the annular zone. The increase in radial sagittal power radially outwards from the innermost edge of the annular zone may be a linear increase.

The radial curvature power may be constant radially outwards from the inner edge of the annular region along a given meridian, or may increase radially outwards from the inner edge of the annular region along a given meridian.

The radial curvature power may vary with meridian around the annular region, between a minimum value X1, and a maximum value X2, wherein both X1 and X2 are greater than the base radial curvature power. Both X1 and X2 may be greater than the base curvature power. The radial curvature power may vary periodically around the annular region. The variation may be defined by a sinusoidal wave-form, a triangular waveform, a square waveform or a saw-tooth waveform. The radial curvature power may vary continuously between X1 and X2. Defining the position around the circumference of the annular region by an angle θ, where θ varies between 0° and 360°, there may be a maximum in radial curvature power every 90°, every 45°, every 20°, or every 10°. X1 may be between +0.5 D and +10.0 D. X2 may be between +2.0 D and +20.0 D.

Alternatively, and or additionally, the radial sagittal power of the annular region may vary with meridian around the annular region between a maximum value Y1 and a minimum value Y2, wherein both Y1 and Y2 are greater than the base radial sagittal power. Both Y1 and Y2 may be greater than the base radial sagittal power. The radial sagittal power may vary periodically around the annular region. The peri-odic variation in radial sagittal power may vary around the entire annular region, or around a portion of the annular region. The variation may be defined by a sinusoidal wave-form, a triangular waveform, or a sawtooth waveform. The radial sagittal power may vary continuously between Y1 and Y2. Defining the position around the circumference of the annular region by an angle θ, where θ varies between 0° and 360°, there may be a maximum radial sagittal power every 90°, every 45°, every 20°, or every 10°. Y1 may be between +0.5 and +9.0 D. Y2 may be between +2.0 and +19.0 D.

In embodiments of the present disclosure wherein the radial curvature power of the annular region varies between a minimum value X1, and a maximum value X2, both X1 and X2 may be greater than Y. In embodiments of the present disclosure wherein the radial sagittal power of the annular region varies between a minimum value Y1, and a maximum value Y2, both Y1 and Y2 may be less than X. In embodi-ments of the present disclosure wherein the radial curvature power of the annular region varies between a minimum value X1, and a maximum value X2, and the radial sagittal power of the annular region varies between a minimum value Y1, and a maximum value Y2, the variations of the radial curvature power and the radial sagittal power may be in phase or out of phase. At any meridian around the annular region, the radial curvature power may be greater than the radial sagittal power. Both the radial sagittal power and a radius of curvature of the annular region may vary with meridian around the annular region, in a manner such that the radial curvature power of the lens remains constant, or approximately constant moving around the annular region. For example, for a lens having a constant radial curvature power of +3.0 D, the radial sagittal power may vary between +2.0 D and +3.0 D with meridian moving around the annular region. For regions having a radial sagittal power of +3.0 D, the radius of curvature of the annular region will be centred on the first optical axis. For regions having a radial sagittal power of +2.0 D, the centre of curvature of the annular region will be shifted away from the first optical axis, and the radius of curvature of the annular region may change.

The contact lens may include at least two concentric annular regions. For each of the at least two annular regions, at a point half way across the width of the annular region, the annular region may have a radial curvature power of X, wherein X is greater than the base radial curvature power. Each of the at least two annular regions may have an off-axis centre of curvature that is a first distance from the optical axis, such that, at a point halfway across its width, the annular region has a radial sagittal power of Y, wherein Y is greater than the base radial sagittal power, and wherein Y is less than X. Each annular region may include any of the features of an annular region described above. For embodi-ments having at least two concentric annular regions, each annular region may have the same radial curvature power profile and the same radial sagittal power profile, or each concentric annular region may have a different radial cur-vature power profile and/or radial sagittal power profile. For embodiments having at least two concentric annular regions, the annular regions may be separated by a region having the base power (i.e., the same power as the central region).

The contact lens may comprise an elastomer material, a silicone elastomer material, a hydrogel material, or a sili-cone hydrogel material, or combinations thereof. As under-stood in the field of contact lenses, a hydrogel is a material that retains water in an equilibrium state and is free of a silicone-containing chemical. A silicone hydrogel is a hydrogel that includes a silicone-containing chemical. Hydrogel materials and silicone hydrogel materials, as described in the context of the present disclosure, have an equilibrium water content (EWC) of at least 10% to about 90% (wt/wt). In some embodiments, the hydrogel material or silicone hydrogel material has an EWC from about 30% to about 70% (wt/wt). In comparison, a silicone elastomer material, as described in the context of the present disclosure, has a water content from about 0% to less than 10% (wt/wt). Typically, the silicone elastomer materials used with the present methods or apparatus have a water content from 0.1% to 3% (wt/wt). Examples of suitable lens formulations include those having the following United States Adopted Names (USANs): methafilcon A, ocufilcon A, ocufilcon B, ocufilcon C, ocufilcon D, omafilcon A, omafilcon B, comfilcon A, enfilcon A, stenfilcon A, fanfilcon A, etafilcon A, senofilcon A, senofilcon B, senofilcon C, narafilcon A, narafilcon B, balafilcon A, samfilcon A, lotrafilcon A, lotrafilcon B, somofilcon A, riofilcon A, delefilcon A, verofilcon A, kalifilcon A, and the like.

Alternatively, the lens may comprise, consist essentially of, or consist of a silicone elastomer material. For example, the lens may comprise, consist essentially of, or consist of a silicone elastomer material having a Shore A hardness from 3 to 50. The shore A hardness can be determined using conventional methods, as understood by persons of ordinary skill in the art (for example, using a method DIN 53505). Other silicone elastomer materials can be obtained from NuSil Technology or Dow Chemical Company, for example.

According to a second aspect, the present disclosure provides a method of manufacturing a lens. The method may comprise forming a contact lens, wherein the contact lens comprises a central region, the central region having a first optical axis, a base curvature power and a base sagittal power, and centred on a centre of curvature that is on the first optical axis. The lens comprises an annular region. The annular region has a radial curvature power of X. X is greater than the base radial curvature power. The annular region has an off-axis centre of curvature that is a first distance from the optical axis, and such that, at a point halfway across its width, the annular region has a radial sagittal power of Y, wherein Y is greater than the base radial sagittal power, and wherein Y is less than X.

The lens may include any of the features set out above.

The method of manufacturing may comprise forming a female mold member with a concave lens forming surface and a male mold member with a convex lens forming surface. The method may comprise filling a gap between the female and male mold members with bulk lens material. The method may further comprise curing the bulk lens material to forms the lens.

The contact lens may be a formed using a lathing process. The lens can be formed by cast molding processes, spin cast molding processes, or lathing processes, or a combination thereof. As understood by persons skilled in the art, cast molding refers to the molding of a lens by placing a lens forming material between a female mold member having a concave lens member forming surface, and a male mold member having a convex lens member forming surface.

The method of manufacturing a lens may include designing a contact lens, wherein the designed lens is a lens according to an embodiment of the present disclosure, and includes any of the features described above. The lens may be designed using modelling, which may be computer-implemented modelling.

The method may comprise modelling a first contact lens. The first contact lens may have a central region, the central region having a first optical axis. The central region may have a base power, and may be centred on a centre of curvature that is on a first optical axis. The first contact lens may have an annular region that surrounds the central region. The annular region may have a radius of curvature that is centred on the first optical axis, wherein the curvature of the annular region gives rise to an add-power, wherein the net power of the annular region is the sum of the base power and the add-power. The method may comprise modelling a second contact lens. The second contact lens may have the same central region as the first contact lens. The central region of the second lens may have the same base power as the first lens, and may be centred on a centre of curvature that is on a first optical axis. The second contact lens may have an annular region that surrounds the central region. The annular region of the second lens may have a radius of curvature that is centred on the first optical axis, and the curvature of the second annular region of the second lens may give rise to an add-power that is greater than the add-power of the first contact lens. The net power of the second lens will be the sum of the base power and the add-power of the second lens. The net power of the second lens may be greater than the net power of the first lens. The method of designing the lens may comprise, within the model, tilting the annular region of the second lens, such that the outer circumference, or outer edge of the annular region matches the outer edge of the annular region of the first lens, whilst keeping the inner edge of the annular region fixed. Tilting the annular region of the second lens will move the centre of curvature of the annular region away from the first optical axis. Tilting the annular region of the second lens will give rise to a third modelled lens, i.e., the tilted second lens. The third lens, or tilted second lens, will have an annular region that gives rise to the same net power as the un-tilted second contact lens, but with an off-axis centre of curvature.

The method may of manufacturing a lens may comprise manufacturing a lens based on the modelled third contact lens (i.e., the tilted second lens). As a lens based on the third modelled lens will have a higher curvature than a lens based on the first modelled lens, this lens may have a higher positive spherical aberration. A lens manufactured based on the third contact lens design may also have an extended depth of focus compared to a lens based on either the first or second modelled lenses.

Figure 1B:
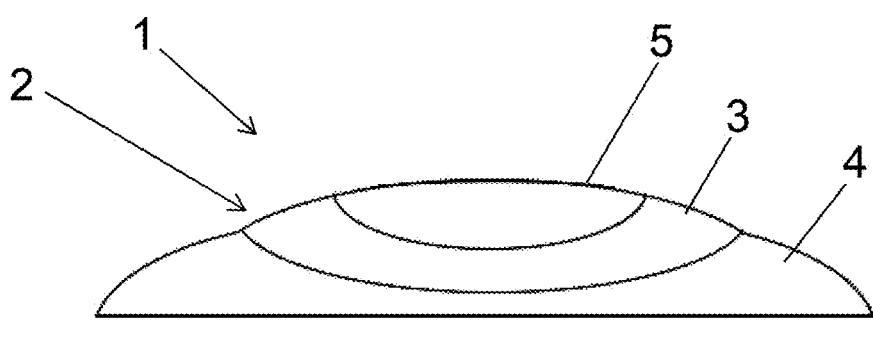
FIG. 1B is a side view of the contact lens of FIG. 1A.
Figures 2A, 2B, 2C:
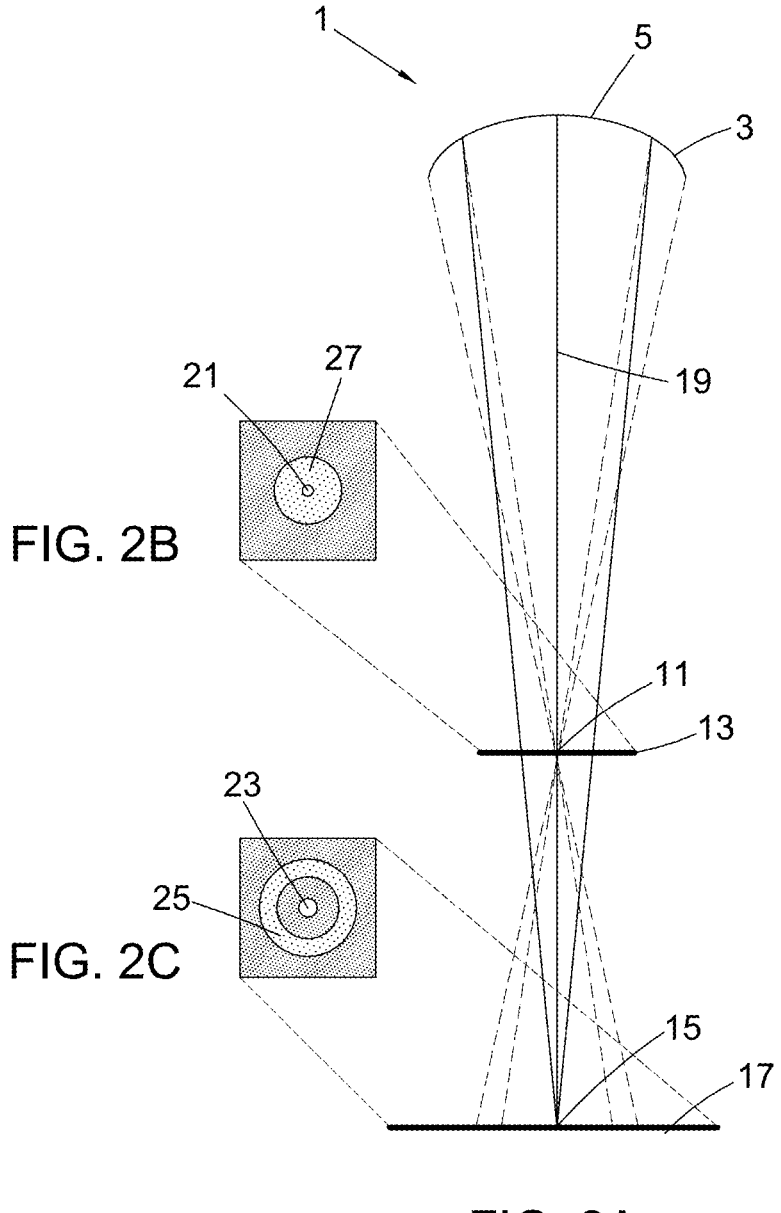
FIG. 2A is a ray diagram for the lens of FIG. 1A.
FIG. 2B shows a light pattern at a proximal focal surface of the lens of FIG. 1A formed from a distant point source.
FIG. 2C shows a light pattern at a distal focal surface of the lens of FIG. 1A formed from a distant point source.
Figure 3:
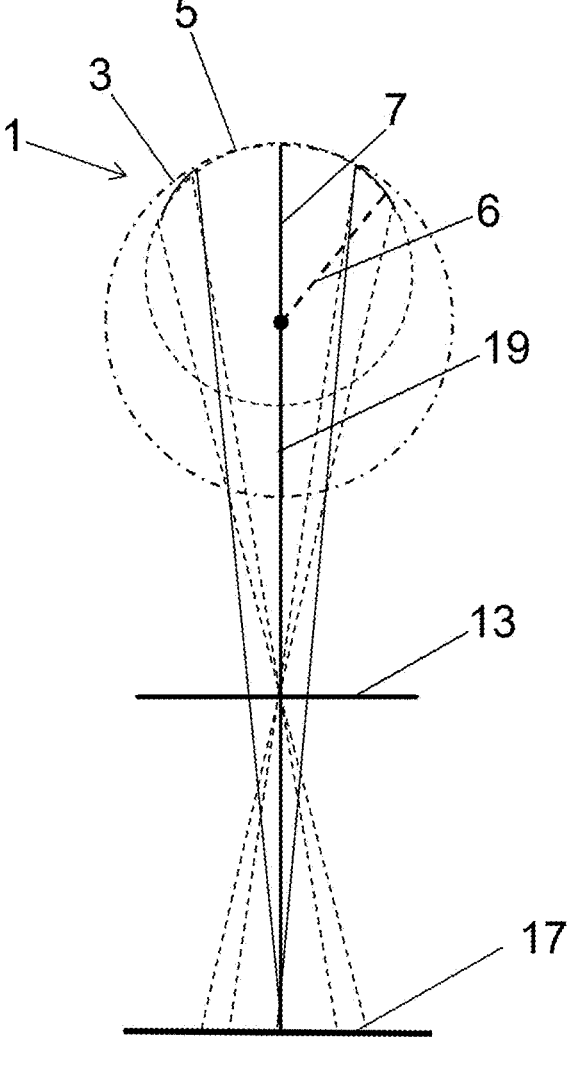
FIG. 3 is a partial ray diagram for the lens of FIGS. 1A and 1B together with circles indicating the radii of curvature of the central distance region (dashed-dotted line) and the annular add region (dashed line) of the contact lens.

FIG. 1A shows a schematic top view of a contact lens 1 that uses a treatment zone that provides a myopically defocused image to reduce the progression of myopia. FIG. 1B shows a schematic side view of the lens 1 of FIG. 1A. The lens 1 comprises an optic zone 2, which approximately covers the pupil, and a peripheral zone 4 that sits over the iris. The peripheral zone 4 provides mechanical functions, including increasing the size of the lens thereby making the lens 1 easier to handle, providing ballasting to prevent rotation of the lens 1, and providing a shaped region that improves comfort for the lens 1 wearer. The optic zone 2 provides the optical functionality of the lens 1, and the optic zone comprises an annular region 3 and a central region 5. The lens 1 has a base radial curvature power, which is equal to the base radial sagittal power. The base power results from a radius of curvature of a surface of the lens 1. The centre of curvature of the central region 5 lies on a first optical axis 19 (shown in FIG. 2A). The annular region 3 has a greater radial curvature power than the base radial curvature power. The annular region 3 radial curvature power is provided by a radius of curvature 6 of the annular region 3, which is smaller than the radius of curvature 7 of the central region 5, as shown in FIG. 3. The centre of curvature of the annular region 3 lies on the first optical axis 19. The annular region 3 has a greater power than the central region 5. As shown in FIG. 2A, the focus 11 of the annular region 3 and the focus 15 of the central region 5 share a common optical axis 19. The focus 11 of the annular region 3 lies on a proximal focal surface 13, and the focus for the central region 5 lies on a distal focal surface 17, which is further away from the posterior surface of the lens. As shown in FIG. 2C, for a point source at infinity, light rays focused by the central region 5 form a focused image 23 at the distal focal surface 17. Light rays focused by the central region 5 also produce an unfocused blur spot 27 at the proximal focal surface 13.

As shown in FIG. 2B, light rays focused by the annular region 3 form a focused image 21 at the proximal focal surface 13. Light rays focused by the annular region 3 diverge after the proximal focal surface 13, and the diverging light rays produce an unfocused annulus 25 at the distal focal surface 17. As discussed above, the unfocused annulus image 25 may result in wearers of the lens 1 seeing a 'halo' around focused distance images.

Figure 4A:
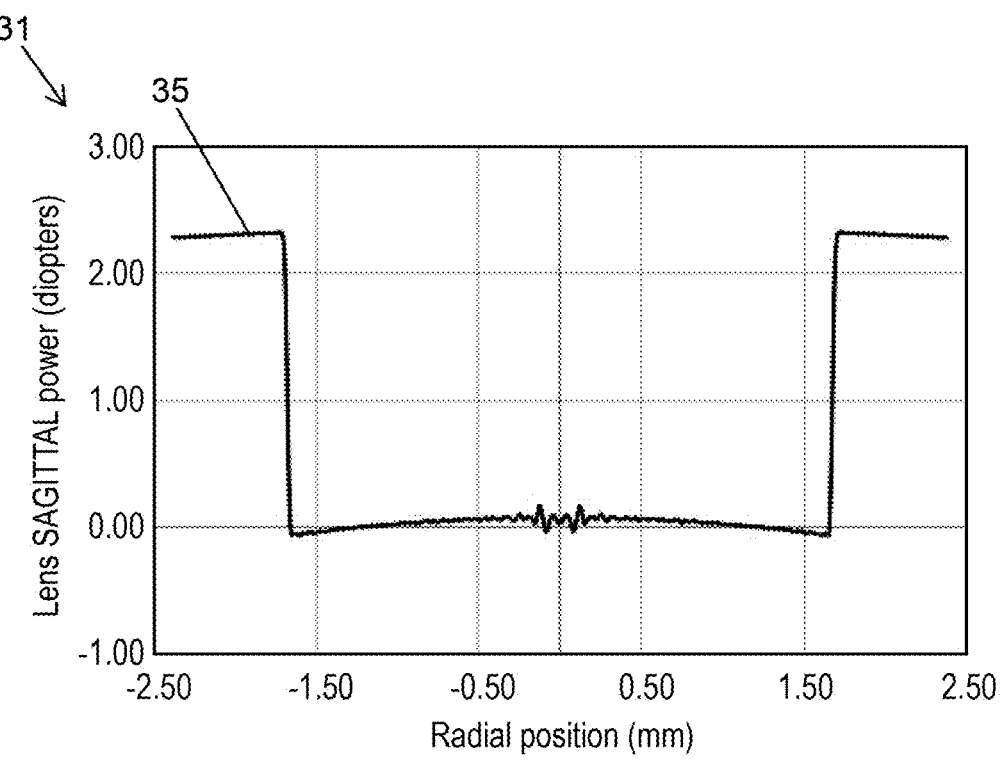
FIG. 4A is a plot showing the variation in radial sagittal power for the lens shown in FIGS. 1A and 1B.
Figure 4B:
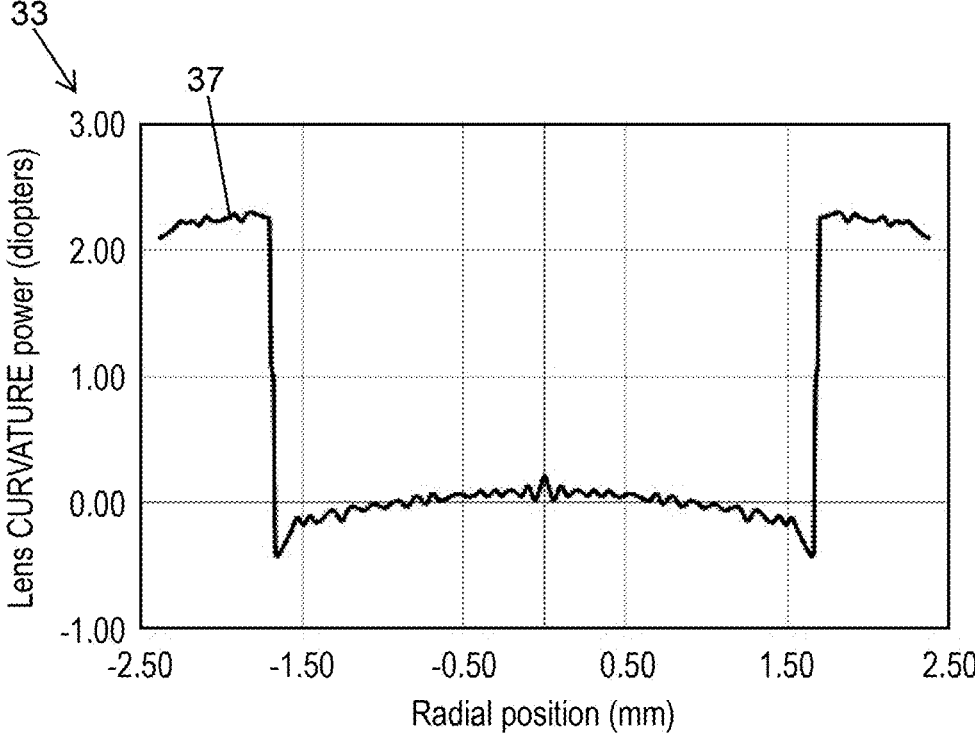
FIG. 4B is a plot showing the variation in radial curvature power for the lens shown in FIGS. 1A and 1B.

FIG. 4A is a plot 31 showing the variation in radial sagittal power for the lens 1 shown in FIGS. 1A and 1B, and FIG. 4B is a plot 33 showing the variation in radial curvature power for the lens 1 shown in FIGS. 1A and 1B. FIGS. 4A and 4B show power variations along a radial diameter of the lens 1. For this lens 1, as the annular region 3 has a greater power than the central region 5, and as the annular region 3 has an on-axis centre of curvature, the radial sagittal power (indicated by curve 35) is greater across the annular region 3 than across the central region 5. The radial curvature power (indicated by curve 37) is also greater across the annular region 3 than across the central region 5.

Figure 5A:
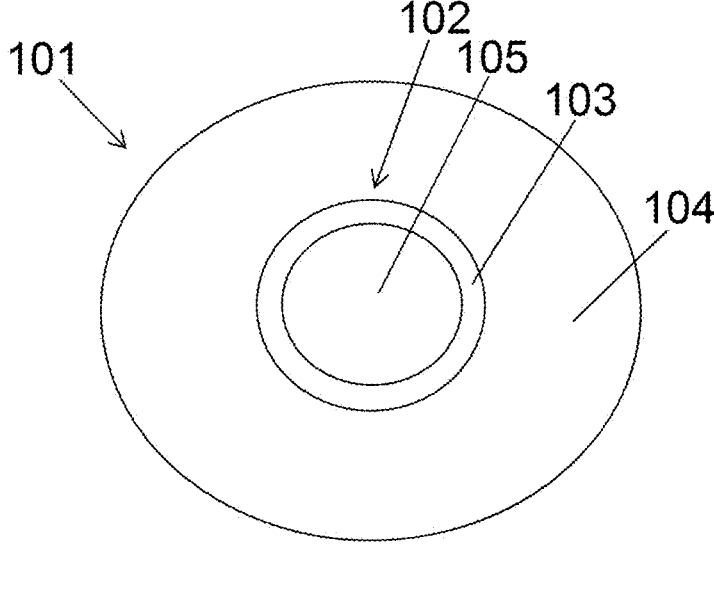
FIG. 5A is a top view of a different contact lens having non-coaxial optics.
Figure 5B:
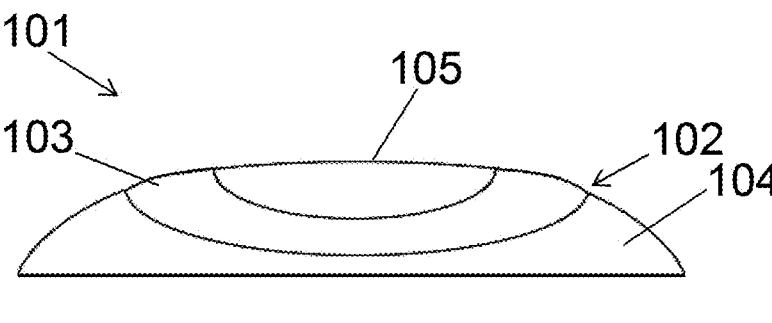
FIG. 5B is a side view of the contact lens of FIG. 5A.
Figures 6A, 6B, 6C:
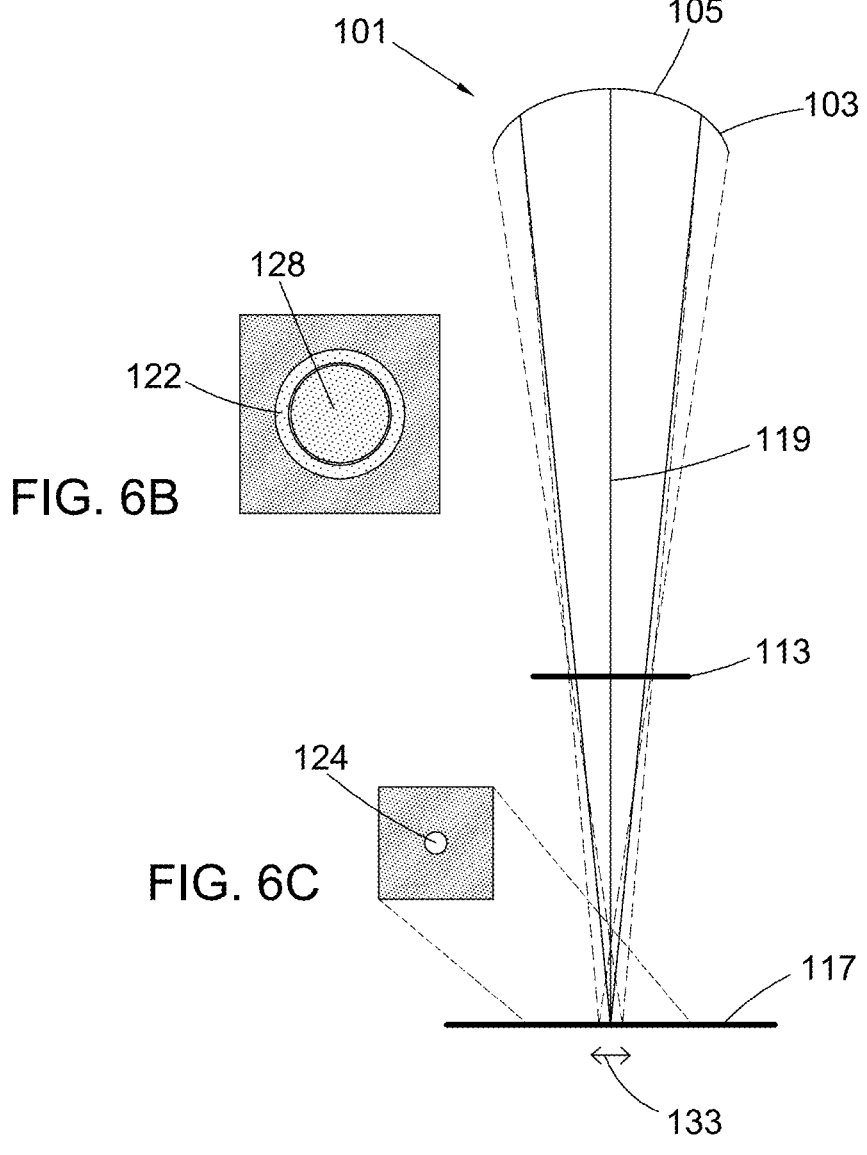
FIG. 6A is a ray diagram for the lens of FIGS. 5A and 5B.
FIG. 6B shows a light pattern at a proximal focal surface of the lens of FIGS. 5A and 5B formed from a distant point source.
FIG. 6C shows a light pattern at a distal focal surface of the lens of FIGS. 5A and 5B formed from a distant point source.
Figure 6D:
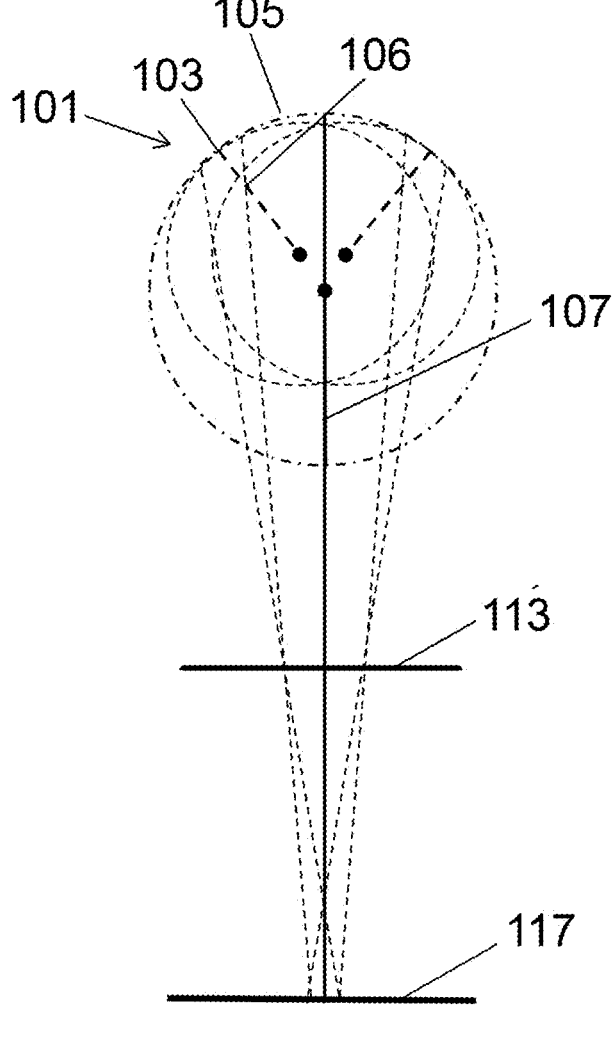
FIG. 6D is a partial ray diagram for the lens of FIGS. 5A and 5B together with circles indicating the radii of curvature of the central distance region (dashed-dotted line) and the annular add region (dashed line) of the contact lens.

FIG. 5A shows a schematic top view of another contact lens 101 having non-coaxial optics. FIG. 5B is a schematic side view of the lens 101 of FIG. 5A Similar to the lens 1 of FIG. 1A, the lens 101 comprises an optic zone 102, which approximately covers the pupil, and a peripheral zone 104 that sits over the iris. The peripheral zone 104 provides mechanical functions, including increasing the size of the lens thereby making the lens 101 easier to handle, providing ballasting to prevent rotation of the lens 101, and providing a shaped region that improves comfort for the lens 101 wearer. The optic zone 102 provides the optical functionality of the lens 101, and the optic zone comprises an annular region 103 and a central region 105. The lens 101 has a base radial curvature power, which is equal to the base radial sagittal power. The base power results from a radius of curvature of a surface of the lens 101. The centre of curvature of the central region 105 lies on a first optical axis 119 (shown in FIG. 6A). The annular region 103 has a greater radial curvature power than the base radial curvature power. The annular region 103 radial curvature power is provided by a radius of curvature of the annular region 103, which is smaller than the radius of curvature of the central region 105. However, in contrast to the lens 1 of FIGS. 1A and 1B, for the lens 101 shown in FIGS. 5A and 5B, the curvature of the annular region 103 cannot be defined by a single sphere, and a centre of curvature of the annular region 103 does not lie on the first optical axis 119. This is shown in FIG. 6D. The annular region 103 is tilted relatively to the central region 105, so that the outer edge of the annular region 103 is higher (in FIG. 5B) relative to its inner edge than is the case in the lens 1 of FIGS. 1A and 1B, which alters the radial sagittal power of the annular region 103, but does not alter the radial curvature power of the annular region 103. As shown in FIG. 6D, the anterior surface of the central region 105 defines a portion of a surface of a sphere of larger radius 107. The anterior surface of the annular region 103 defines a curved annular surface with smaller radius 106.

At the distal focal surface 117, light rays passing through the central region 105 are focused. The annular region 103 acts as an optical beam stop, which leads to a small spot size 133 of light 124 at the distal focal surface 117, as shown in FIG. 6C.

A single image is not formed at the proximal focal surface 113. As shown in FIG. 6B, at the proximal focal surface 113, for a point source at infinity, light rays passing through the central region 105 generate a blur circle 128, as does the lens of FIGS. 1A, 1B and 2A, 2B. However, light rays from a distant point source passing through the annular region 103 generate a focused annulus 122, as shown in FIG. 6B, which surrounds the blur circle 128. FIG. 6B shows the light pattern generated for a distant point source. In contrast to the lens 1 of FIGS. 1A and 1B, the lens 101 of FIGS. 5A and 5B does not generate a single image or an on-axis image at the proximal focal surface 113 that could be used to avoid the need for the eye to accommodate for near objects. For an extended object at distance, the focused image formed at the proximal focal surface 113 is a convolution of (i) the focused image of the extended object that would be obtained with a conventional lens having the optical power of the annular region 103 and (ii) an optical transfer function representing the optical effect of the annular region 103.

In contrast to the lens 1 of FIGS. 1A and 1B, an annulus or 'halo' effect does not occur at the distal focal surface 117.

Figure 7A:
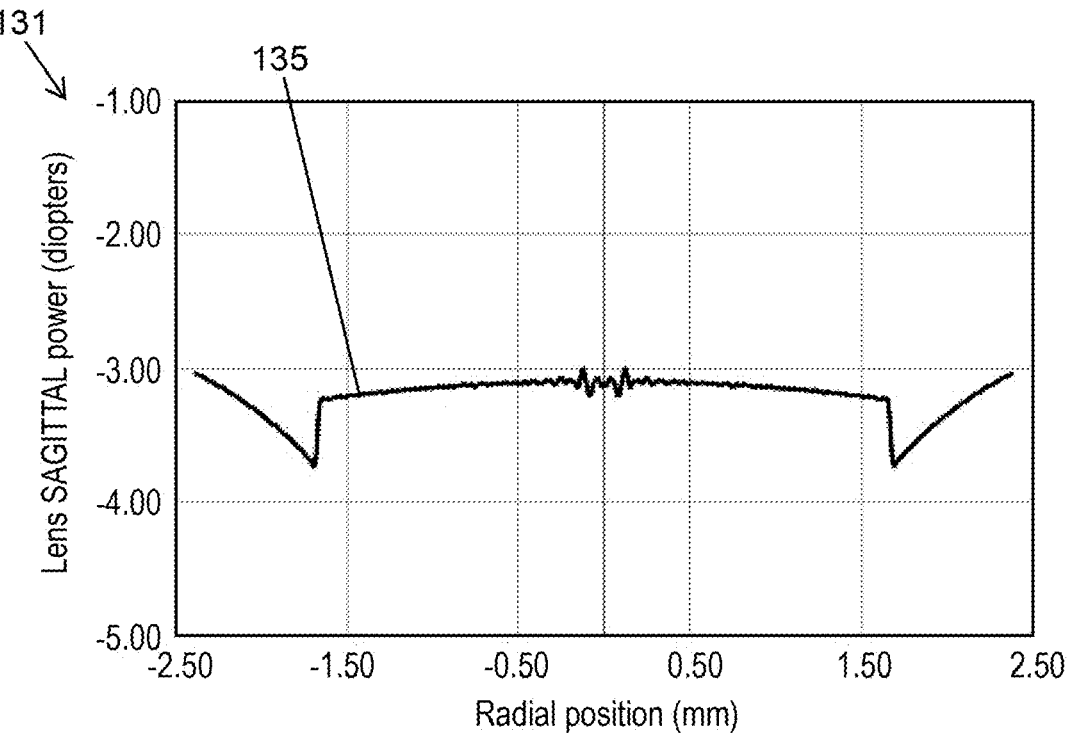
FIG. 7A is a plot showing the variation in radial sagittal power for the lens shown in FIGS. 5A and 5B.
Figure 7B:
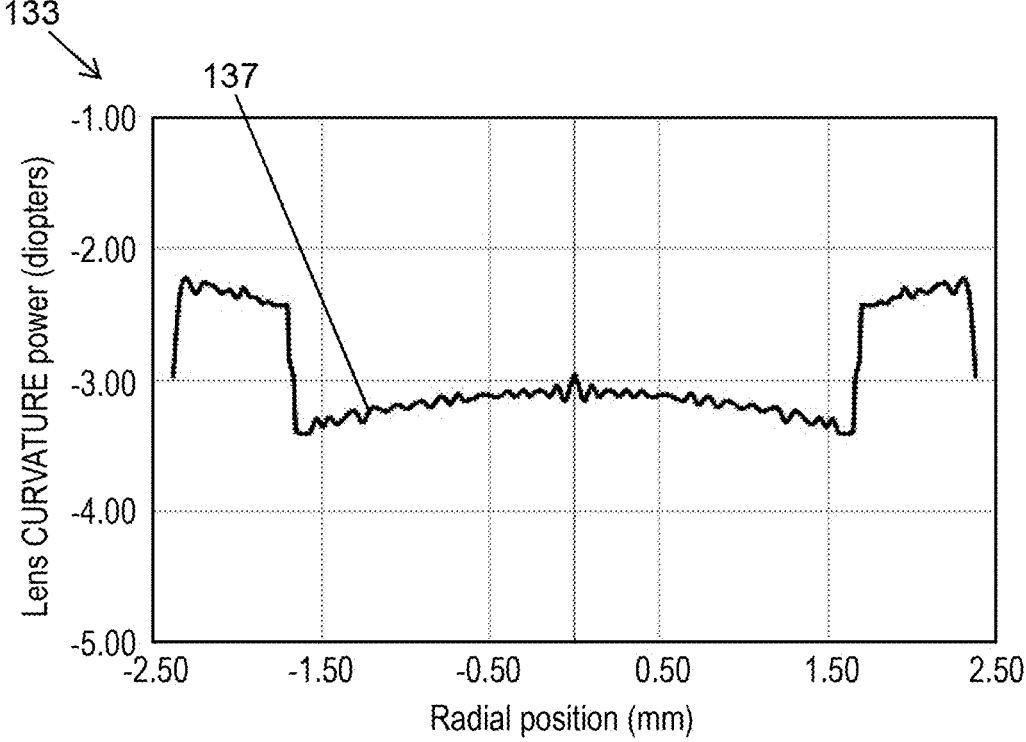
FIG. 7B is a plot showing the variation in radial curvature power for the lens shown in FIGS. 5A and 5B.

FIG. 7A is a plot 131 showing the variation in radial sagittal power for the lens 101 shown in FIGS. 5A and 5B, and FIG. 7B is a plot 133 showing the variation in radial curvature based power for the lens shown in FIGS. 5A and 5B. FIGS. 7A and 7B show power variations along a radial diameter of the lens 101. For this lens 101, as the annular region 103 has a greater power than the central region 105, and this means that the radial curvature power (indicated by curve 137) is greater across the annular region 103 than across the central region 105. However, the annular region 103 is tilted relative to the central region 105, such that the annular region 103 has an off-axis centre of curvature. The tilt of the annular region 103 relative to the central region 105 means that in the radial sagittal power is more negative than the radial sagittal power of the central region at the boundary between the central region 105 and the annular region 105, as shown by the curve 135. The radial sagittal power may increase with increasing radial distance towards the outer edge of the annular region 103.

Figure 8A:
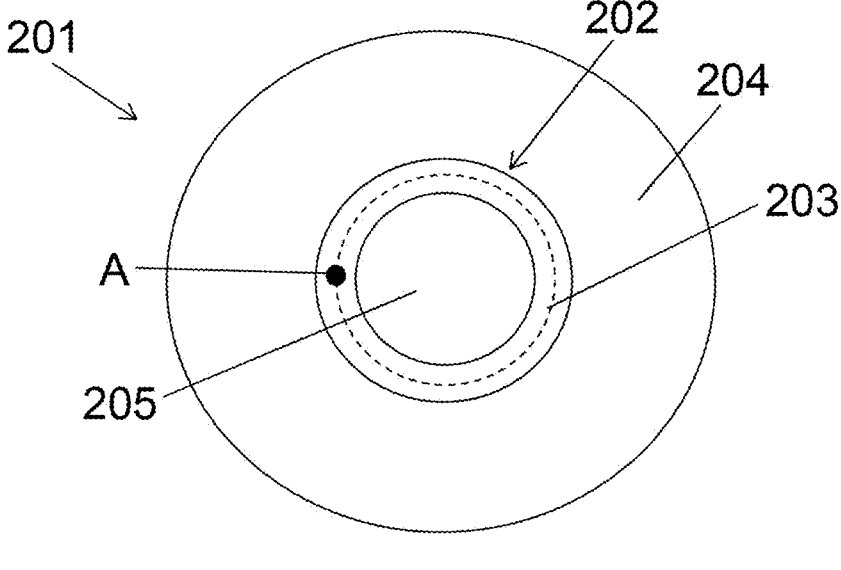
FIG. 8A is a top view of a lens according to an embodiment of the present disclosure.

FIG. 8A shows a schematic top view of a contact lens 201 according to an embodiment of the present disclosure. Similar to the lens 1 of FIGS. 1A and 1B and the lens 101 of FIGS. 5A and 5B, the lens 201 comprises an optic zone 202, which approximately covers the pupil, and a peripheral zone 204 that sits over the iris. The peripheral zone 204 provides mechanical functions, including increasing the size of the lens thereby making the lens 201 easier to handle, providing ballasting to prevent rotation of the lens 201, and providing a shaped region that improves comfort for the lens 201 wearer. The optic zone 202 provides the optical functionality of the lens 201, and the optic zone comprises an annular region 203 and a central region 205. The central region 205 of the lens 201 has a base radial curvature power, which is equal to the base radial sagittal power. In this example embodiment of the present disclosure, the base radial curvature power of the central region is 0.0 D, which is equal to the base radial sagittal power of the central region 205. This base power results from a radius of curvature of a surface of the lens 201. The centre of curvature 244 of the central region 205 lies on a first optical axis 219 (shown in FIG. 9). The annular region 203 has a greater radial curvature power than the base radial curvature power. The annular region 203 radial curvature power is provided by a radius of curvature of the annular region 203, which is smaller than the radius of curvature of the central region 205.

At a point, A, halfway across the width of the annular region (indicated in FIGS. 8A and 8B), the radial curvature power of the annular region has a value of about +3.5 D. For the example lens 201 shown in FIGS. 8A and 8B, the radial curvature power is constant at all meridians around the annular region 203, for a given radial position. This means that the radial curvature power will have the same value along the dashed curve 241 shown in FIGS. 8A and 8B, which is a curve extending around the annular region 203, at a point halfway across the width of the annular region 203. In this example embodiment of the present disclosure, X is about +3.5 D. Similar to the lens shown in FIGS. 5A and 5B, the annular region 203 of the lens 201 has been tilted relative to the central region 205, so that a centre of curvature 243 of the annular region 203 is offset from the first optical axis 219. This is shown in FIG. 9. Tilting the annular region 203 relative to the central region 205 reduces the radial sagittal power at the boundary between the central region 205 and the annular region 203. At the point, A, halfway across the width of the annular region 203, the radial sagittal power has a value Y, which is greater than the base radial sagittal power, but less than the X. For this example embodiment, Y is about +2.25 D, and radial sagittal power is constant at all meridians around the annular region 203, for a given radial position. This means that the radial sagittal power will have the same value along the dashed curve 241 shown in FIGS. 8A and 8B, which is a curve extending around the annular region 203.

At a distal focal plane 217, light rays passing through the central region 205 are focused. Light rays passing through the annular region 203 are directed towards a sagittal add focal plane 218.

Figure 8B:
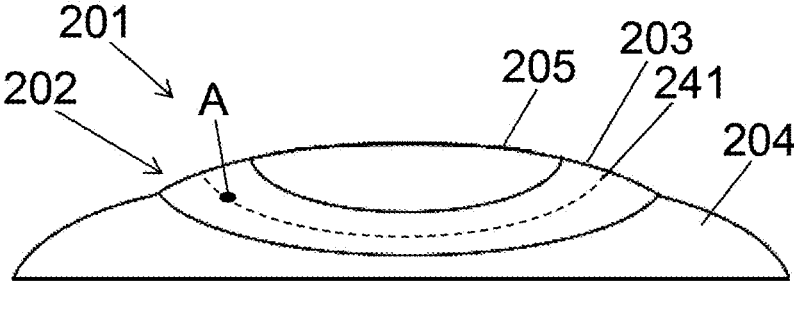
FIG. 8B is a side view of the contact lens of FIG. 8A.
Figure 9:
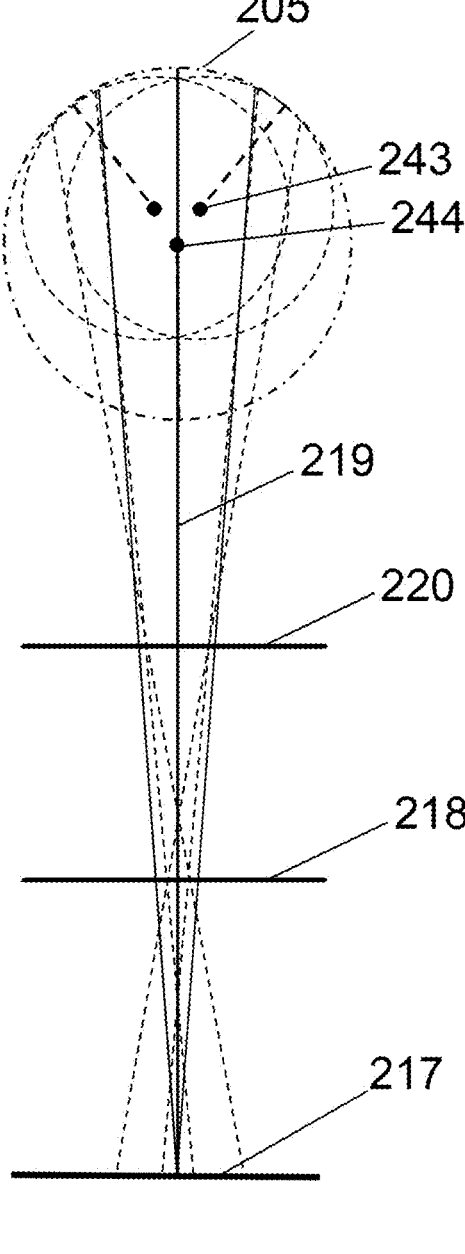
FIG. 9 is a partial ray diagram for the lens of FIGS. 8A and 8B together with circles indicating the radii of curvature of the central distance region (dashed-dotted line) and the annular add region (dashed line) of the contact lens.
Figure 10A:
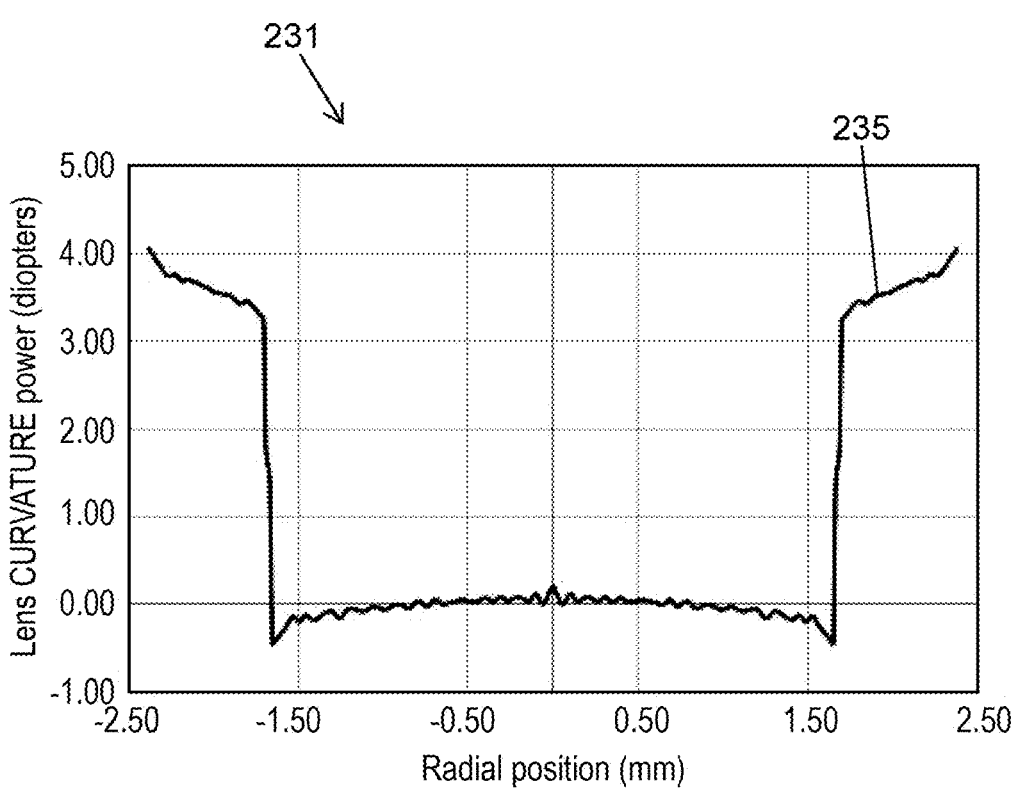
FIG. 10A is a plot showing the variation in radial curvature power for the lens shown in FIGS. 8A and 8B.

FIG. 10A is a plot 231 showing the variation in curvature power across a radial diameter of the lens 201 shown in FIGS. 8A and 8B. This plot 231 shows the average of the radial and circumferential curvature power. Across the central region 205, the curvature power of the lens 201 is constant, and approximately zero. At the boundary between the central region 205 and the annular region 203, the curvature power shows a sharp increase, as indicated by the curve 235. This is due to an increase in the radial curvature power. The circumferential curvature power will not change significantly at the boundary between the central region 205 and the annular region 203, but the radial curvature power will increase, and thus the average curvature power (indicated by the curve 235) will increase at the boundary between the central region 205, to an average of the circumferential curvature power and the radial curvature power.

Figure 10B:
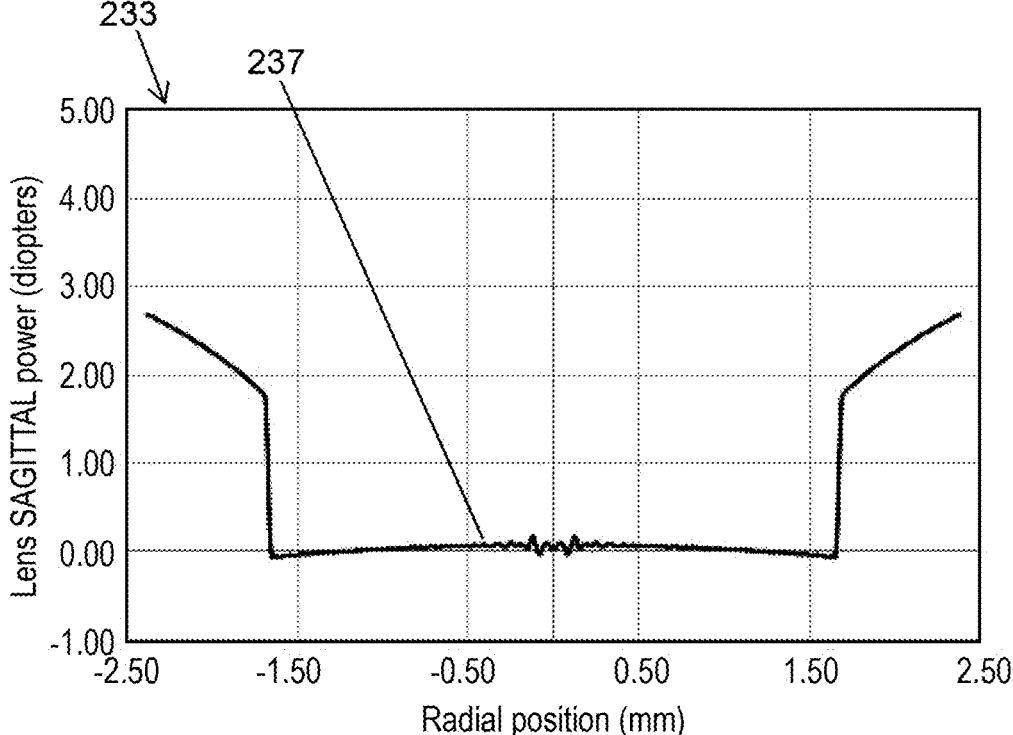
FIG. 10B is a plot showing the variation in radial sagittal power for the lens shown in FIGS. 8A and 8B.

FIG. 10B is a plot 233 showing the variation in sagittal power across a radial diameter of the lens 201 shown in FIGS. 8A and 8B. This plot 233 shows the average of the radial and circumferential sagittal power. Across the central region 205 of the lens 201, the sagittal power is constant and has a value of 0.0 D. At the boundary between the central region 205 and the annular region 203, the sagittal power of the annular region 203 increases sharply, due to an increase in the radial sagittal power, as indicated by the curve 237. The radial sagittal power increases extending radially outwards across the width of the annular region 203, in an approximately linear manner. In contrast to the sagittal power curve shown in FIG. 7A for a lens having an off-axis add-power annular region 203, there is no dip in the sagittal power at the boundary between the central region 205 and the annular region 203. This is because the annular region 203 has been tilted relative to the central region, in a manner that increases the radial sagittal power at the boundary between the central region 205 and the annular region 203. The increase in sagittal power at the boundary between the central region 205 and the annular region 205 will not be as large as it would be for a lens having an on-axis add-power annular region, (for example, as shown in FIGS. 1A and 1B).

Figures 11A, 11B, 11C, 11D:
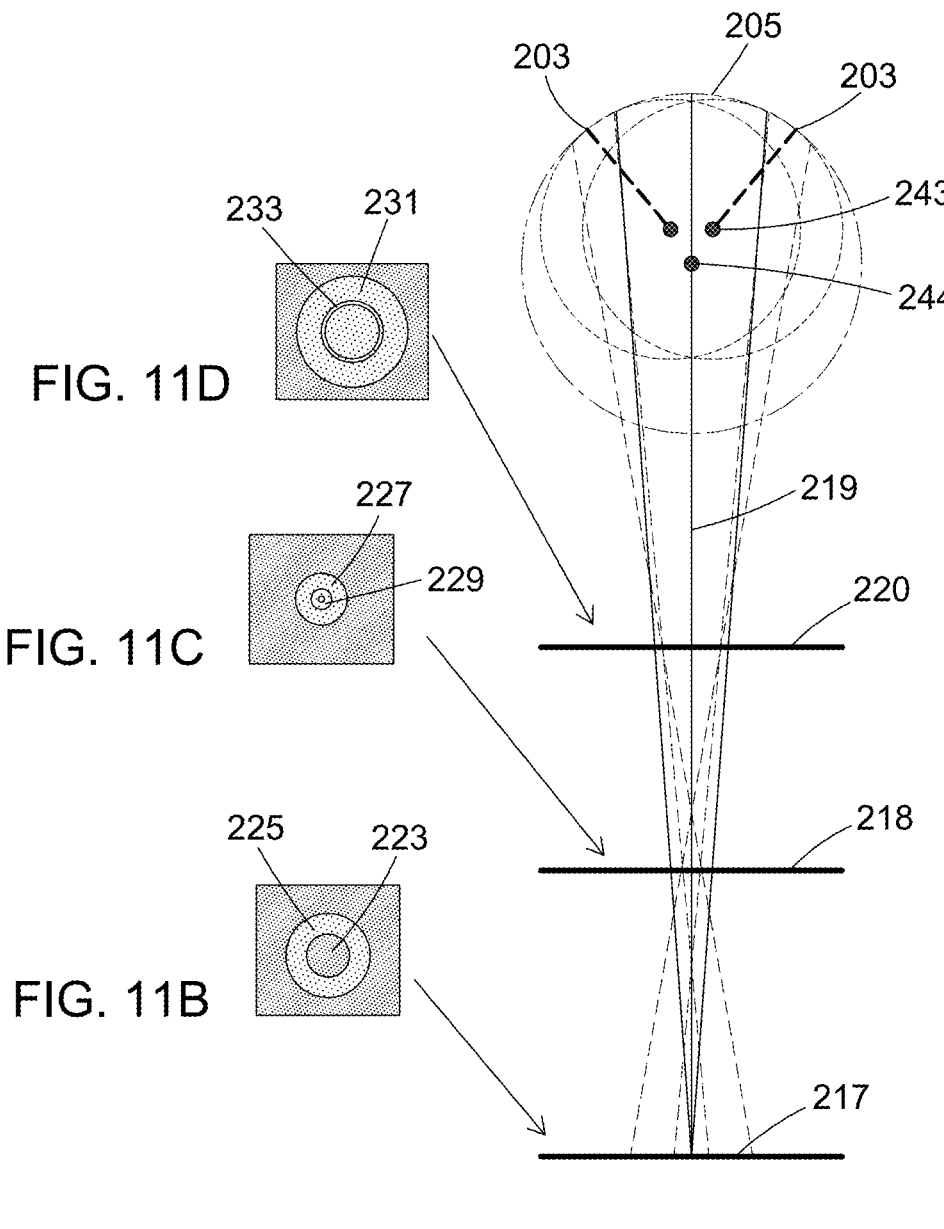
FIG. 11A is a ray diagram for the lens of FIGS. 8A and 8B.
FIG. 11B shows a light pattern at a distal focal surface of the lens of FIGS. 8A and 8b) formed from a distant point source.
FIG. 11C shows a light pattern at a first proximal focal plane of the lens of FIGS. 8A and 8B formed from a distant point source.
FIG. 11D shows a light pattern at a second proximal focal plane of the lens of FIGS. 8A and 8B formed from a distant point source.
Figure 12A:
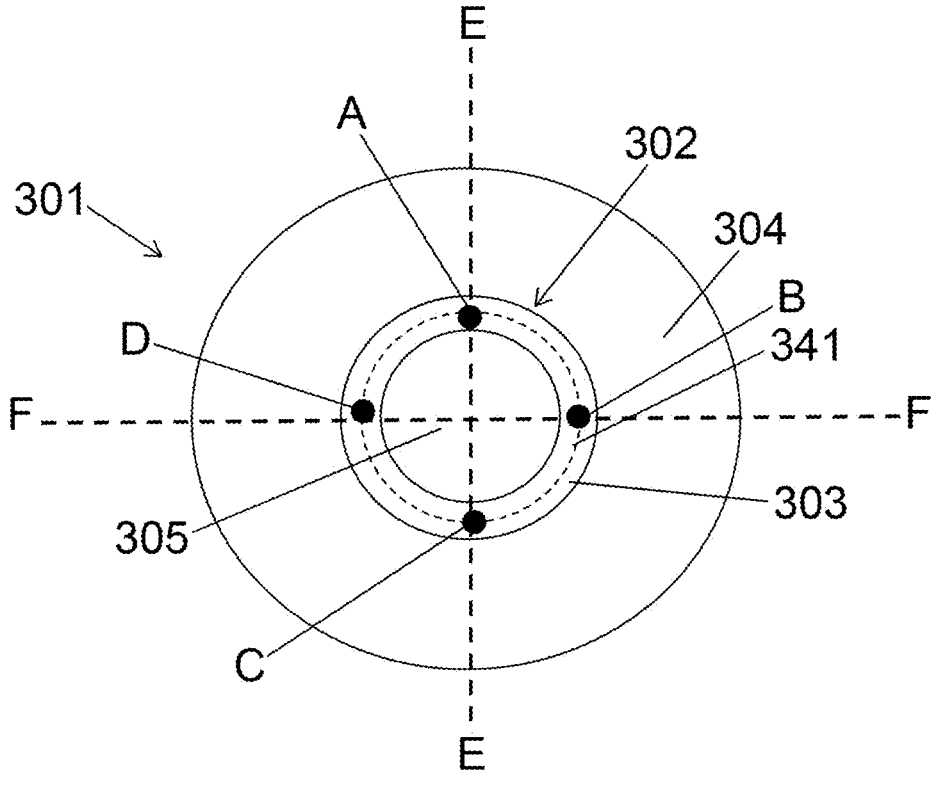
FIG. 12A is a top view of a lens according to an embodiment of the present disclosure, having a variation in radial curvature power.
Figure 12B:
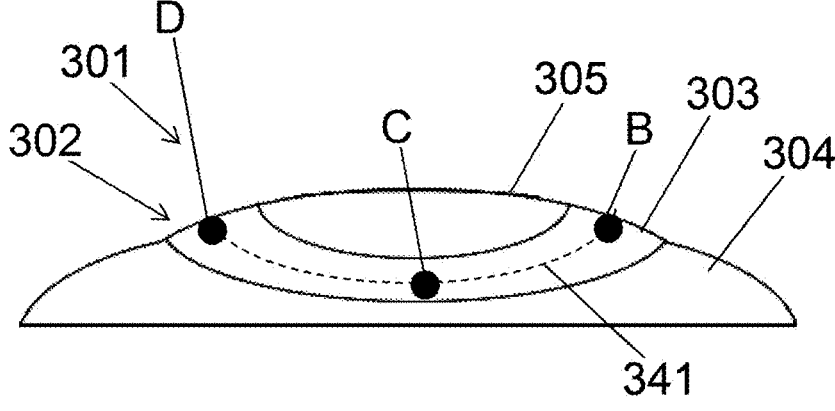
FIG. 12B is a side view of the contact lens of FIG. 12A.
Figure 14:
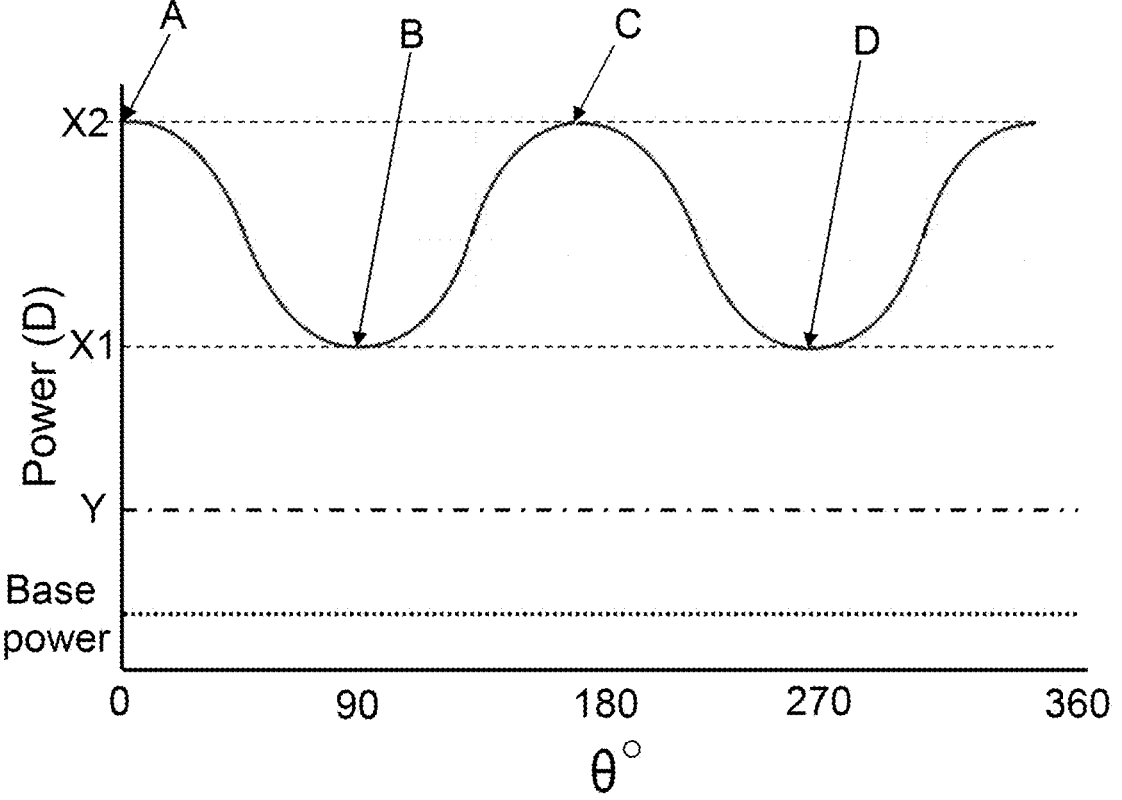
FIG. 14 is a schematic graph showing sinusoidal variation in radial curvature power with angle $\theta$ around the annular region for the lens shown in FIGS. 12A and 12B.

As shown in FIG. 11A, for the lens 201 shown in FIGS. 8A and 8B, at a distal focal surface 217, light rays passing through the central region 205 will form a focused image 223, as shown in FIG. 11B. Light rays passing through the annular region 203 will produce an unfocused annulus 225 at the distal focal surface 217. At a first proximal focal plane 218, for a point source at infinity, light rays passing through the central region 205 will generate a first blur circle 227 and light rays passing through the annular region 203 will generate a second blur circle 229, as shown in FIG. 11C. At a second proximal focal surface 220, light rays passing through the central region 205 will generate a third blur circle 231 and light rays passing through the annular region 203 will generate a focused annulus 233 lying within the third blur circle 231, as shown in FIG. 11D. FIG. 12A shows a schematic top view a contact lens 301 according to an embodiment of the present disclosure. Similar to the lens 201 of FIGS. 8A and 8B, the lens 301 comprises an optic zone 302, which approximately covers the pupil, and a peripheral zone 304 that sits over the iris. The peripheral zone 304 provides mechanical functions, including increasing the size of the lens thereby making the lens 301 easier to handle, providing ballasting to prevent rotation of the lens 301, and providing a shaped region that improves comfort for the lens 301 wearer. The optic zone 302 provides the optical functionality of the lens 301, and the optic zone 302 comprises an annular region 303 and a central region 305. The lens 301 has a base radial curvature power, which is equal to the base radial sagittal power. In this example embodiment of the present disclosure, the base radial curvature power of the central region is −2.0 D, and the base radial sagittal power of the central region is −2.0 D. The base power results from a radius of curvature of a surface of the lens 301. The centre of curvature of the central region 305 lies on a first optical axis. The annular region 303 has a greater radial curvature power than the base radial curvature power. The radial curvature power of the annular region 303 varies with meridian around the annular region 303. In this example embodiment, the radial curvature power is approximately constant extending radially outwardly along any meridian. Along a curve running around the annular region 303 halfway across the width of the annular region, indicated by the dashed line 341 in FIGS. 12A and 12B, the radial curvature power varies between a minimum value X1, and a maximum value X2. Both X1 and X2 are greater than the base curvature power of the central region 305. X1 is +2.0 D and X2 is +10.0 D. The radial curvature power varies in a sinusoidal manner around the annular region, with a profile shown in FIG. 14. Defining the position around the circumference of the annular region 303 using the angle θ, where θ varies between 0° and 360°, for this example embodiment, the radial curvature power has a maximum value of X2 at a point halfway across the width of the annular region 303 every 180°, such that the radial curvature is X2 at points A and C. The radial curvature power has a minimum value of X1 at a point halfway across the width of the annular region 303 every 180°, such that the radial curvature is X1 at points B and D.

Figure 13A:
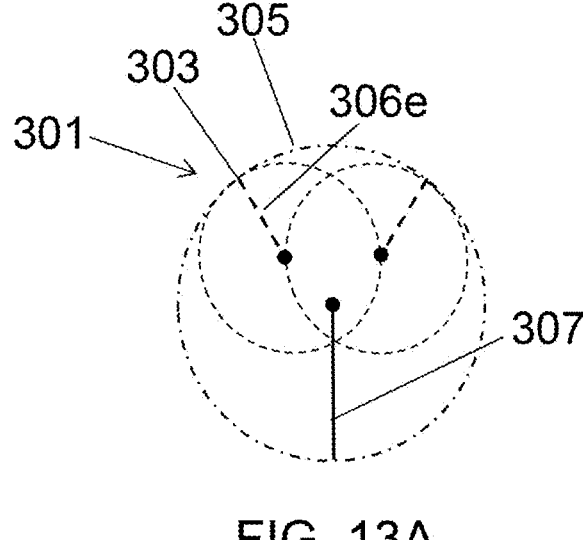
FIG. 13A is a schematic diagram for the lens of FIGS. 12A and 12B taken along the line E-E, together with circles indicating the radii of curvature of the central distance region (dashed-dotted line) and the annular add region (dashed line) of the contact lens.
Figure 13B:
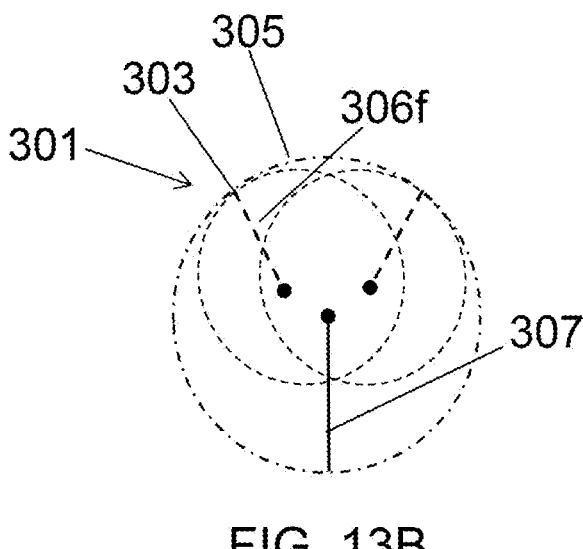
FIG. 13B is a schematic diagram for the lens of FIGS. 12A and 12B taken along the line F-F, together with circles indicating the radii of curvature of the central distance region (dashed-dotted line) and the annular add region (dashed line) of the contact lens.

The radial curvature power of the annular region 303 results from a curvature of a surface of the annular region 303. At all points around the annular region 303, the radius of curvature of the annular region 303 is smaller than the radius of curvature 307 of the central region 305. At all points around the annular region 303, the annular region 303 has an off-axis centre of curvature. In this example embodiment, the radius of curvature of the annular region 303 varies with meridian, and this gives rise to the varying radial curvature power. As shown in FIG. 13A, along a radial diameter wherein the radial curvature has a maximum value (line E-E in FIG. 12A), the radius of curvature 306e of the annular region 303 will be smallest (FIG. 13A). As shown in FIG. 13B, along a radial diameter wherein the radial curvature has a minimum value (line F-F in FIG. 12A), the radius of curvature 306f of the annular region 303 will be largest.

For this lens 301, at a point halfway across the width of the annular region 303, the radial sagittal power has a constant value of Y has a constant value around the annular region 305. Y is less than X, but Y is greater than the base power of the central region 305 of the lens 301, as shown schematically in FIG. 14.

In other embodiments of the present disclosure (not shown), the lens is similar to the lens shown and described in FIGS. 8A-11D, but at a point, A, halfway across the width of the annular region (as shown in FIGS. 8A and 8B), the radial curvature power of the annular region is about +10.0 D greater than the base radial curvature power of the central region (i.e., the radial curvature add power is about +10.0 D), and the radial sagittal power of the annular region is about +2.0 D greater than the base radial sagittal power of the central region (i.e., the radial sagittal add power is about +2.0 D).

In other embodiments of the present disclosure (not shown), the lens is similar to the lens shown and described in FIGS. 8A-11D, but at a point, A, halfway across the width of the annular region, the radial curvature power of the annular region is about +12.0 D greater than the base radial curvature power of the central region (i.e., the radial curvature add power is about +12.0 D), and the radial sagittal power of the annular region is about +4.0 D greater than the base radial sagittal power of the central region (i.e., the radial sagittal add power is about +4.0 D). Advantageously, such a lens will show a sharp increase in radial sagittal power at a boundary between the central region and the annular region. The increase in radial sagittal power may be more than +2.0 D. For a lens wearer with a relatively small pupil diameter (for example, a young lens wearer), this sharp increase in radial sagittal power at the boundary between the central region and the annular region may improve the treatment effect of the annular region.

In other embodiments of the present disclosure (not shown), the lens is similar to the lens shown and described in FIGS. 8A-11D, but at a point, A, halfway across the width of the annular region (as shown in FIGS. 8A and 8B), the radial curvature power of the annular region is about +11.0 D greater than the base radial curvature power of the central region (i.e., the radial curvature add power is about +11.0 D), and the radial sagittal power of the annular region is about +3.0 D greater than the base radial sagittal power of the central region (i.e., the annular region the radial sagittal add power is about +3.0 D).

In other embodiments of the present disclosure (not shown), the lens is similar to the lens shown and described in FIGS. 8A-11D, but at a point, A, halfway across the width of the annular region (as shown in FIGS. 8A and 8B), the radial curvature power of the annular region is about +12.0 D greater than the base radial curvature power of the central region (i.e., the radial curvature add power is about +12.0 D), and the radial sagittal power of the annular region is about +3.0 D greater than the base radial sagittal power of the central region (i.e., the annular region the radial sagittal add power is about +3.0 D).

Figure 15:
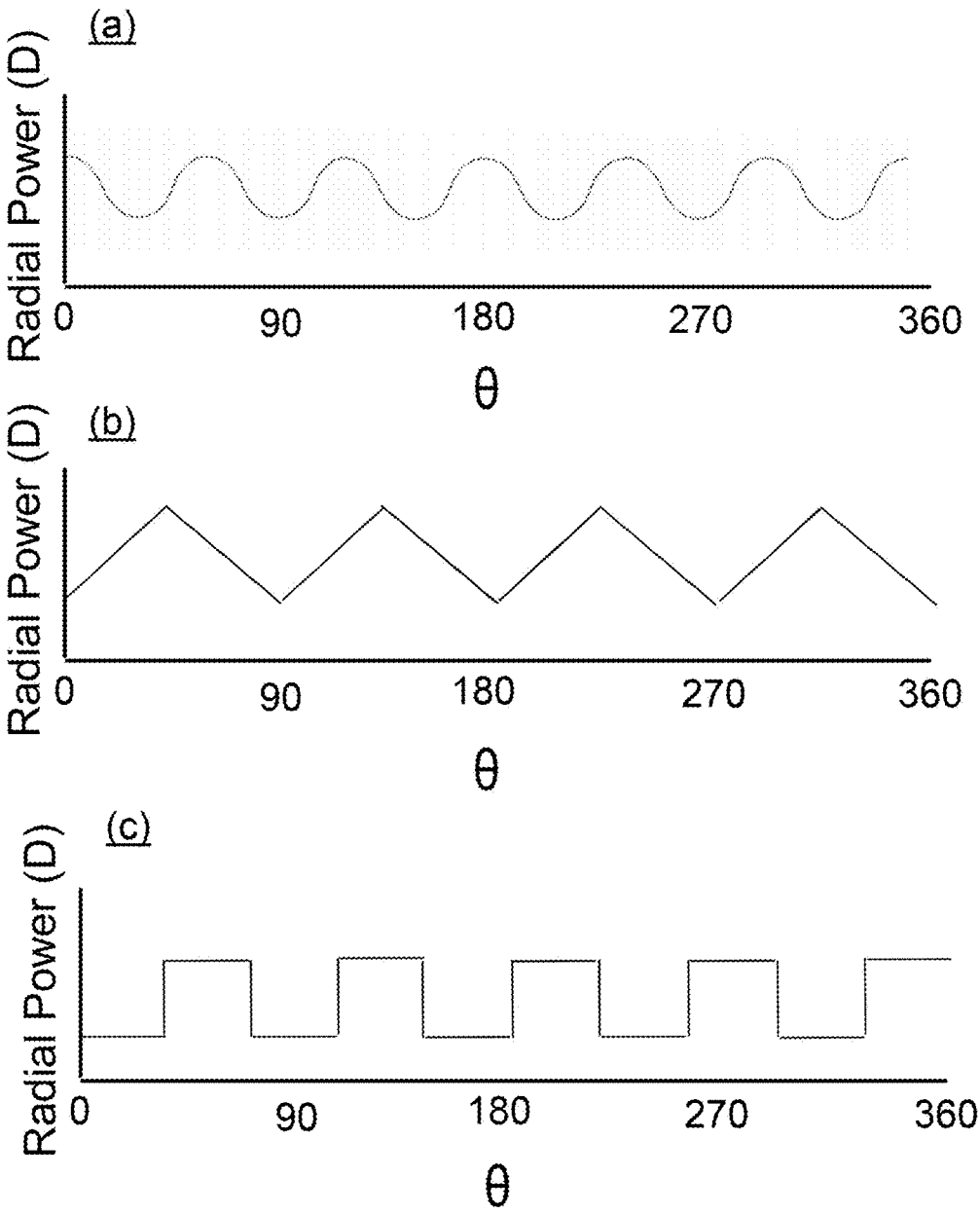
FIG. 15A is a schematic graph showing a sinusoidal variation power with angle $\theta$ around the annular region for a lens according to an embodiment of the present disclosure.
FIG. 15B is a schematic graph showing a sawtooth variation power with angle $\theta$ around the annular region for a lens according to an embodiment of the present disclosure.
FIG. 15C is a schematic graph showing a square-wave variation power with angle $\theta$ around the annular region for a lens according to an embodiment of the present disclosure.

In other embodiments of the present disclosure (not shown), the lens is similar to the lens shown and described in FIGS. 8A-11D, but at a point, A, halfway across the width of the annular region (as shown in FIGS. 8A and 8B), the radial curvature power of the annular region is about +10.0 D greater than the base radial curvature power of the central region (i.e., the radial curvature add power is about +10.0 D), and the radial sagittal power of the annular region is about +3.0 D greater than the base radial sagittal power of the central region (i.e., the radial sagittal add power is about +3.0 D). In other embodiments of the present disclosure, lenses may have an annular region with a radial curvature power that varies with meridian in a stepwise manner, or in a sawtooth manner. The variation may be periodic or non-periodic. There may be peaks in radial curvature power every 180°, every 90°, every 20°, every 10° or every 5°. By way of example, periodic variations in radial power, which may be variations in radial sagittal or curvature power, are shown in FIGS. 15A-C.

In other embodiments of the present disclosure, both the radial curvature power and the radial sagittal power may vary with meridian around the annular region. Variation of radial sagittal power may be in phase or out of phase with variation of the radial curvature power. At all points around the circumference of the annular region, the radial sagittal power may be less than the radial curvature power, but greater than the base power of the central region.

In other embodiments of the present disclosure, the lens may include two or more concentric annular regions. For each of the annular regions, at a point half way across the width of the annular region, the annular region has a radial curvature power of X, wherein X is greater than the base radial curvature power. Each of the at least two annular regions may have an off-axis centre of curvature that is a first distance from the optical axis, such that, at a point halfway across its width, the annular region has a radial sagittal power of Y, wherein Y is greater than the base radial sagittal power, and wherein Y is less than X. Each concentric annular region may be separated by a region having the base power (i.e., the same power as the central region).

In other embodiments of the present disclosure, the lens may include two or more concentric annular regions. At least one of the annular regions is an annular region as shown in FIGS. 5A and 6A, and for or at least one of the other annular regions, at a point half way across the width of the annular region, the annular region has a radial curvature power of X, wherein X is greater than the base radial curvature power. Each of the at least two annular regions may have an off-axis centre of curvature that is a first distance from the optical axis, such that, at a point halfway across its width, the annular region has a radial sagittal power of Y, wherein Y is greater than the base radial sagittal power, and wherein Y is less than X.

FIG. 16 shows a method 501 of designing a contact lens, wherein the lens is a lens according to an embodiment of the present disclosure. In a first step 503, the method involves modelling a first contact lens. The first contact lens has a central region, the central region having a first optical axis. The central region has a base power, and is centred on a centre of curvature that is on a first optical axis. In this example, the central region of the first contact lens has a base power of −3.0 D. The first contact lens has an annular region that surrounds the central region. The annular region has a radius of curvature that is centred on the first optical axis. The curvature of the annular region gives rise to an add-power. In this example, the annular region has a curvature that gives rise to an add-power of +2.0 D. The net power of the annular region is the sum of the base power and the add-power, and therefore in this example, the net power of the annular region is −1.0 D. In a second step 505, the method involves modelling a second contact lens. The second contact lens has the same central region as the first contact lens, and so in this example, the second contact lens has a base power of −3.0 D. The second contact lens is also centred on a centre of curvature that is on the first optical axis. The second contact lens has an annular region that surrounds the central region. The annular region of the second lens has a radius of curvature that is also centred on the first optical axis, but the curvature of the annular region gives rise to an add-power that is greater than the add-power of the first lens. In this example, the curvature of the second annular region gives rise to an add-power of +4.0 D. The net power of the second lens is the sum of the base power and the add-power, and therefore in this example, the net power of the second lens is +1.0 D. In a third step 507, the method comprises, within the model, tilting the annular region of the second lens, such that the outer edge of the second annular region matches the outer edge of the annular region of the first lens, whilst keeping the inner edge of the second annular region fixed. This gives rise to a third lens (corresponding to the tilted second lens) that has an annular region with the same net power of the un-tilted second lens. In this example, the third lens, or the tilted second lens, has an annular region with a net power of +1.0 D, but with a centre of curvature that is not on the first optical axis.

Figure 17:
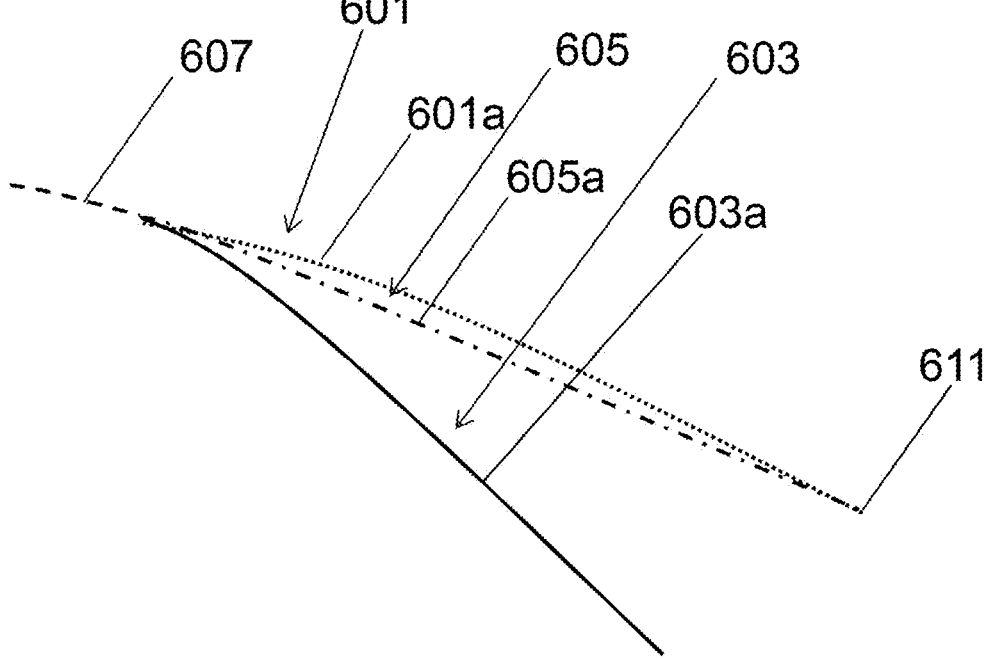
FIG. 17 is a schematic diagram of a radial cross-section through a portion of three modelled lenses modelled using the method described in FIG. 16.

FIG. 17 is a schematic diagram of three modelled lenses 601, 603, 605 modelled as part of the method of designing a lens described above. The three lenses share a common central region 607 which has a curvature providing a base power of −3.0 D, centred on a first optical axis. The first lens 601 has an annular region 601a that has a curvature giving rise to an add-power of +2.0 D, such that the net power of the annular region is −1.0 D. The centre of curvature of the annular region 601a of the first lens 601 is centred on the first optical axis. The second lens 603 has an annular region 603a that has a curvature giving rise to an add-power of +4.0 D, such that the net power of the annular region is +1.0 D. The centre of curvature of the annular region 603a of the second lens 603 is also centred on the first optical axis. The inner edge of the annular region 601a of the first lens 601, and the inner edge of the annular region 603a of the second lens 603 coincide at a point 607. The third lens 605 is a tilted version of the second lens 603. The annular region 605a of the third lens 605 has a curvature that gives rise to an add-power of +4.0 D, having the same add-power and the same net power as the second lens 603. The inner edge of the annular region 605a of the third lens coincides with the same point 607 as the first lens 601 and the second lens 603, but the outer edge of the annular region 605a of the third lens 605 has been tilted to coincide with the outer edge of the annular region 601a of the first lens 601, at a point 611. The annular region 605a of the third lens 605 has a net power of +1.0 D, but is has a centre of curvature that is not on the first optical axis.

It will be appreciated by those of ordinary skill in the art that features of these example embodiments may be combined in other embodiments that fall within the scope of the present disclosure.

Whilst in the foregoing description, integers or elements are mentioned which have known obvious or foreseeable equivalents, then such equivalents are herein incorporated as if individually set forth. Reference should be made to the claims for determining the true scope of the present disclosure, which should be construed as to encompass any such equivalents. It will also be appreciated by the reader that integers or features of the disclosure that are described as advantageous, convenient or the like are optional, and do not limit the scope of the independent claims. Moreover, it is to be understood that such optional integers or features, whilst of possible benefit in some embodiments of the disclosure, may not be desirable and may therefore be absent in other embodiments.

The invention claimed is:

1. A contact lens, the lens including an optic zone comprising:

a central region, the central region having a base power; and an annular region, wherein light rays passing through the central region form a focused image at a distal focal surface and light rays passing through the annular region will form an unfocused annulus at the distal focal surface;

at a first proximal focal surface that is closer to the lens than the distal focal surface, light rays passing through the central region will generate a first blur circle, and light rays passing thorough the annular region will generate a second blur circle; and at a second proximal focal surface that is closer to the lens than the first proximal focal surface, light rays passing through the central region will generate a third blur circle, and light rays passing through the annular region will generate a focused annulus lying within the third blur circle.

2. The contact lens according to claim 1, wherein the base power of the central region results from a curvature of an anterior surface and/or a posterior surface of the lens.

3. The contact lens according to claim 1, wherein a radial slope-based power of the annular region is greater than the base power of the central region over a width of the annular region.

4. The contact lens according to claim 1, wherein at a point halfway across a radial width of the annular region, the annular region has a radial curvature power that is about +10.0 D greater than the base power.

5. The contact lens according to claim 1, wherein at a point halfway across a radial width of the annular region, the annular region has a radial slope-based power that is about +2.0 D greater than the base power.

6. The contact lens according to claim 1, wherein at a point halfway across a radial width of the annular region, the annular region has a radial slope-based power that is about +4.0 D greater than the base power, and a radial curvature power that is about +12.0 D greater than the base power, and wherein there is a sharp increase in radial slope-based power at a boundary between the central region and the annular region.

7. The contact lens according to claim 1, wherein the base power of the lens is between 0.5 D and −15.0 D.

8. The contact lens according to claim 1, wherein the contact lens comprises an elastomer material, a silicone elastomer material, a hydrogel material, or a silicone hydrogel material, or mixtures thereof.

9. The contact lens according to claim 1, wherein the contact lens is formed using a lathing process or a cast molding process.

10. A method of manufacturing a contact lens, the method comprising: forming the contact lens according to claim 1.

11. The method according to claim 10, said method further comprising a step of designing the contact lens, wherein designing the contact lens comprises:

modelling a first contact lens, the first contact lens having:

a central region, wherein the central region has a base power and a centre of curvature that is on a first optical axis; and an annular region that surrounds the central region, the annular region having a radius of curvature that is centred on the first optical axis, wherein a curvature of the annular region gives rise to a first add-power that is greater than the base power;

modelling a second contact lens, wherein the second contact lens has the same central region as the first contact lens, and an annular region that surrounds the central region, wherein the annular region has a radius of curvature that is centred on the optical axis, and the annular region gives rise to a second add-power that is greater than the first add power of the first contact lens;

within the model, tilting the annular region of the second contact lens, such that an outer edge of the annular region matches an outer edge of the annular region of the first lens, thereby generating a third contact lens, wherein the annular region of the third lens has the second add-power of the annular region of the second contact lens, but a centre of curvature that is a first distance from the first optical axis.

12. The method according to claim 11, said method further comprising manufacturing a lens based on the modelled third contact lens.

13. The contact lens according to claim 1, wherein a radial add curvature power of the annular region results from a curvature of an anterior surface and/or a posterior surface of the lens.

14. A contact lens, the lens including an optic zone comprising:

a central region, the central region having a first optical axis, a base power, a centre of curvature that is on the first optical axis and a first radius of curvature; and an annular region, the annular region having a centre of curvature that is shifted, by a first distance, away from the first optical axis, and a second radius of curvature that is smaller than the first radius of curvature, wherein light rays passing through the central region form a focused image at a distal focal surface, and light rays passing through the annular region do not form a spot of light at the distal focal surface.

15. The contact lens according to claim 14, wherein the base power of the central region results from a curvature of an anterior surface and/or a posterior surface of the lens.

16. The contact lens according to claim 14, wherein a radial add curvature power of the annular region results from a curvature of an anterior surface and/or a posterior surface of the lens.

17. The contact lens according to claim 14, wherein a radial slope-based power of the annular region is greater than the base power of the central region over a width of the annular region.

18. A contact lens, the lens including an optic zone comprising:

a central region, the central region having a first optical axis, a base power, a centre of curvature that is on the first optical axis and a first radius of curvature; and an annular region, wherein the annular region is tilted relative to the central region and has a radial curvature add power that is greater than the base power, wherein light rays passing through the central region form a focused image at a distal focal surface, and light rays passing through the annular region do not form a spot of light at the distal focal surface.

19. The contact lens according to claim 18, wherein the radial add curvature power of the annular region results from a curvature of an anterior surface and/or a posterior surface of the lens.

20. The contact lens according to claim 18, wherein the base power of the central region results from a curvature of an anterior surface and/or a posterior surface of the lens.

* * * * *